A. HORTON.
TRANSPORTATION SYSTEM.
APPLICATION FILED APR. 21, 1911.
1,070,472. Patented Aug. 19, 1913.
12 SHEETS—SHEET 6.
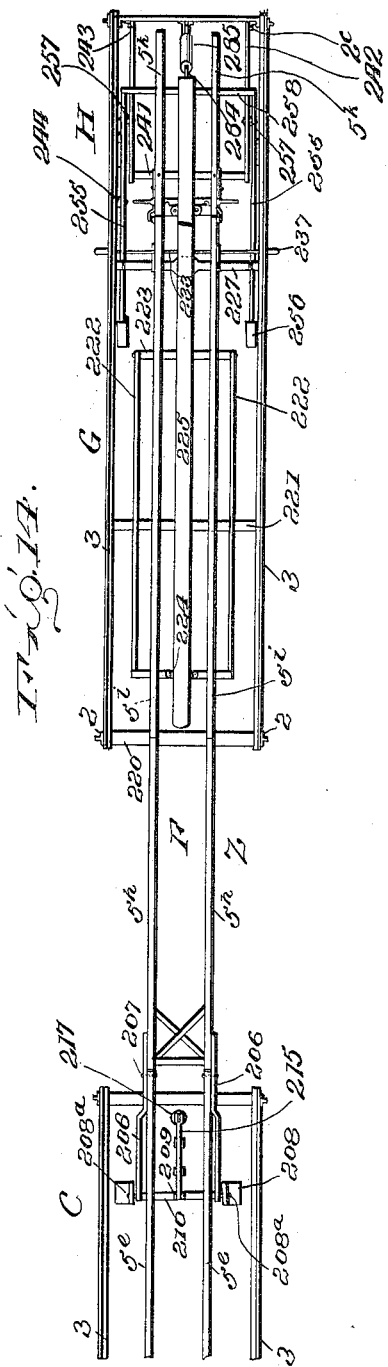
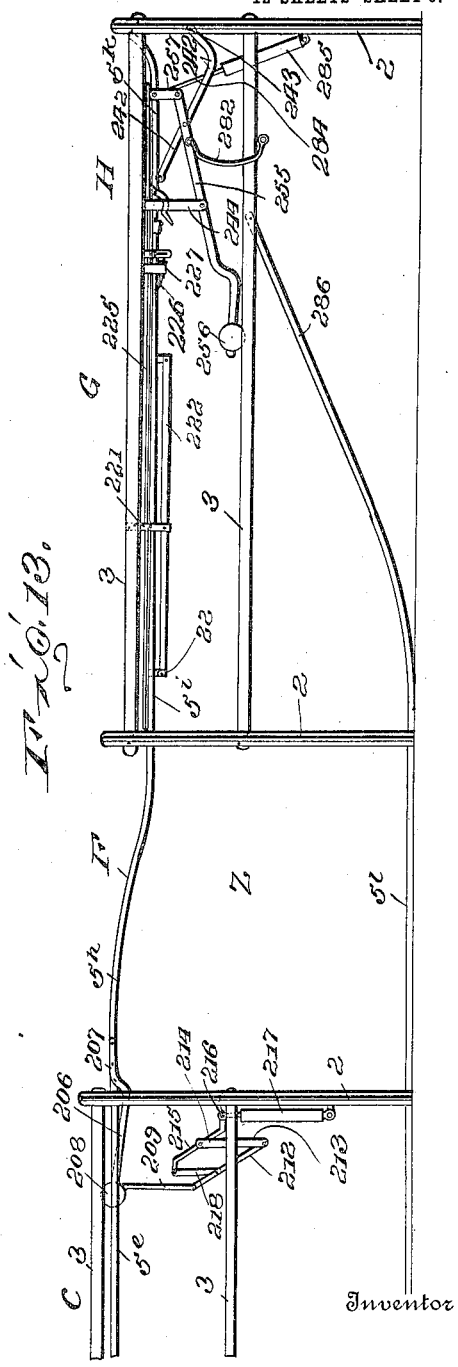

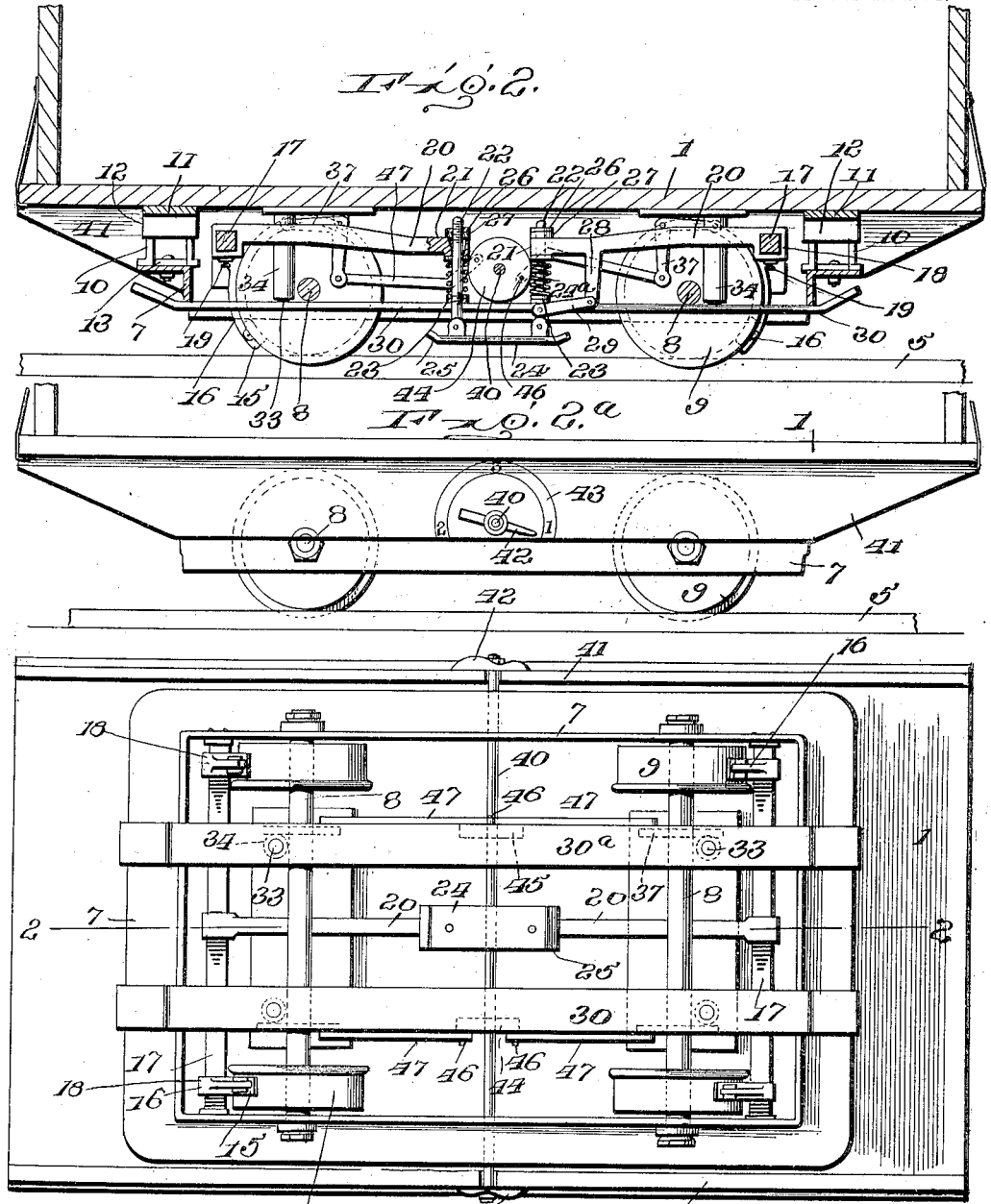

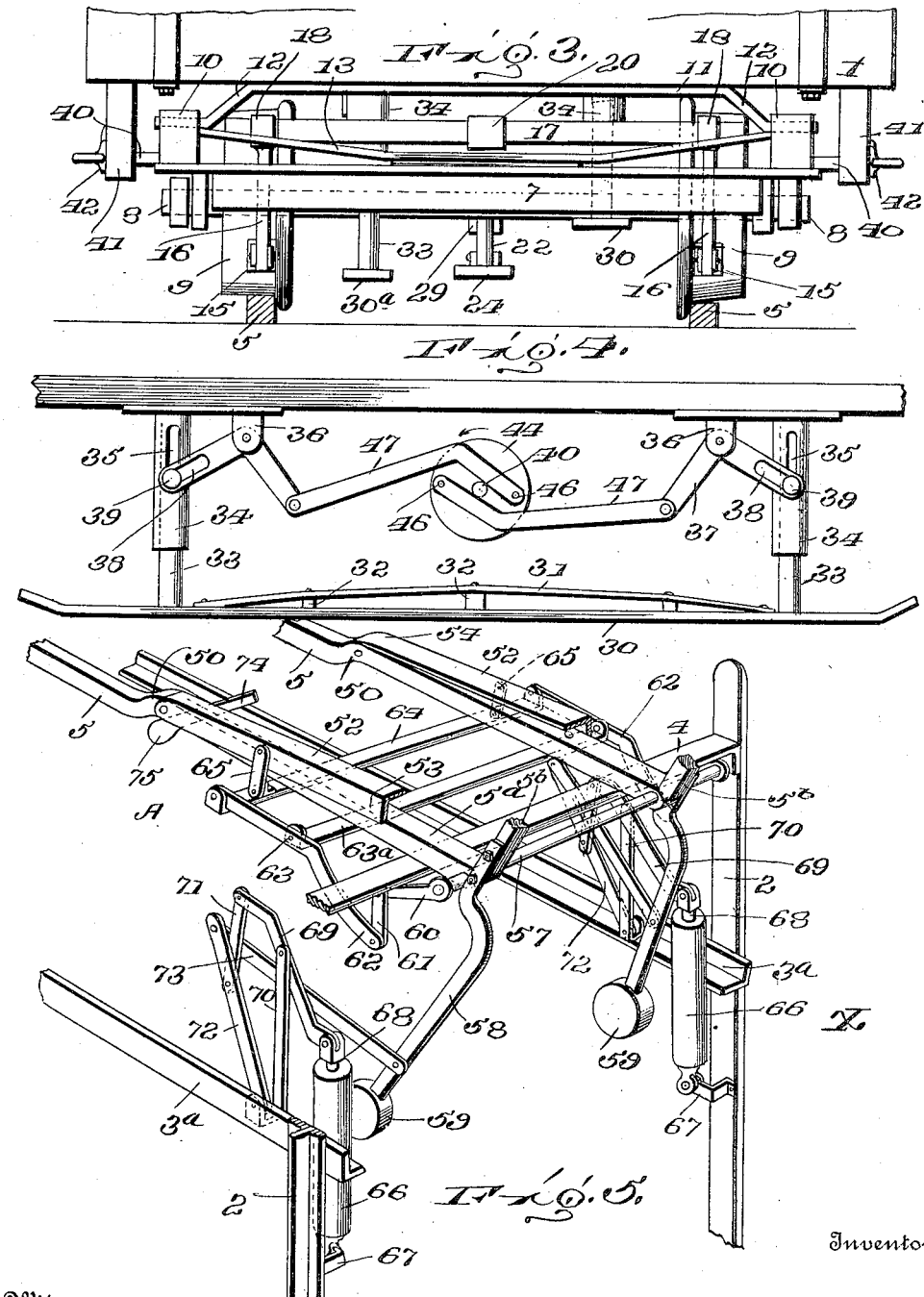

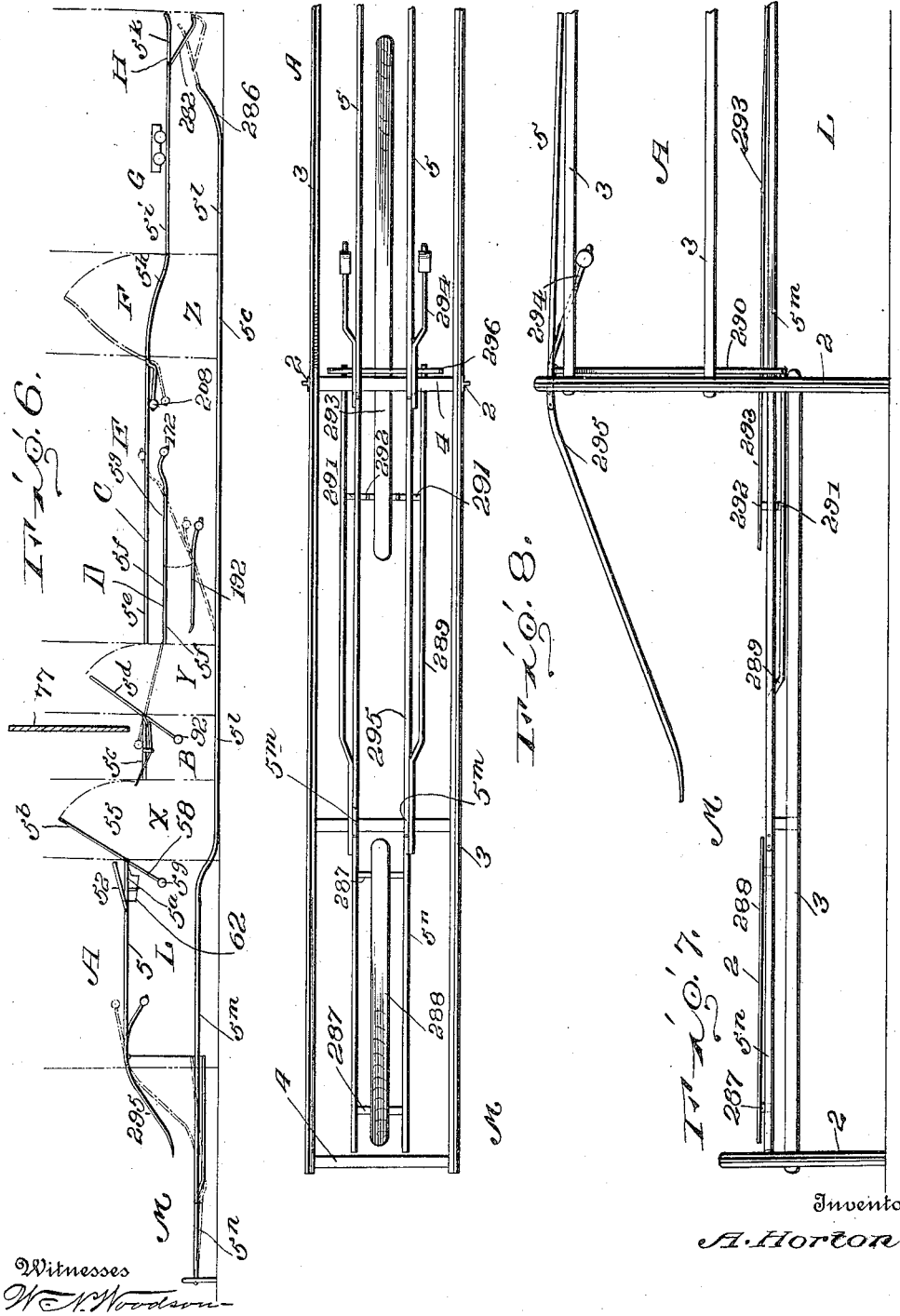

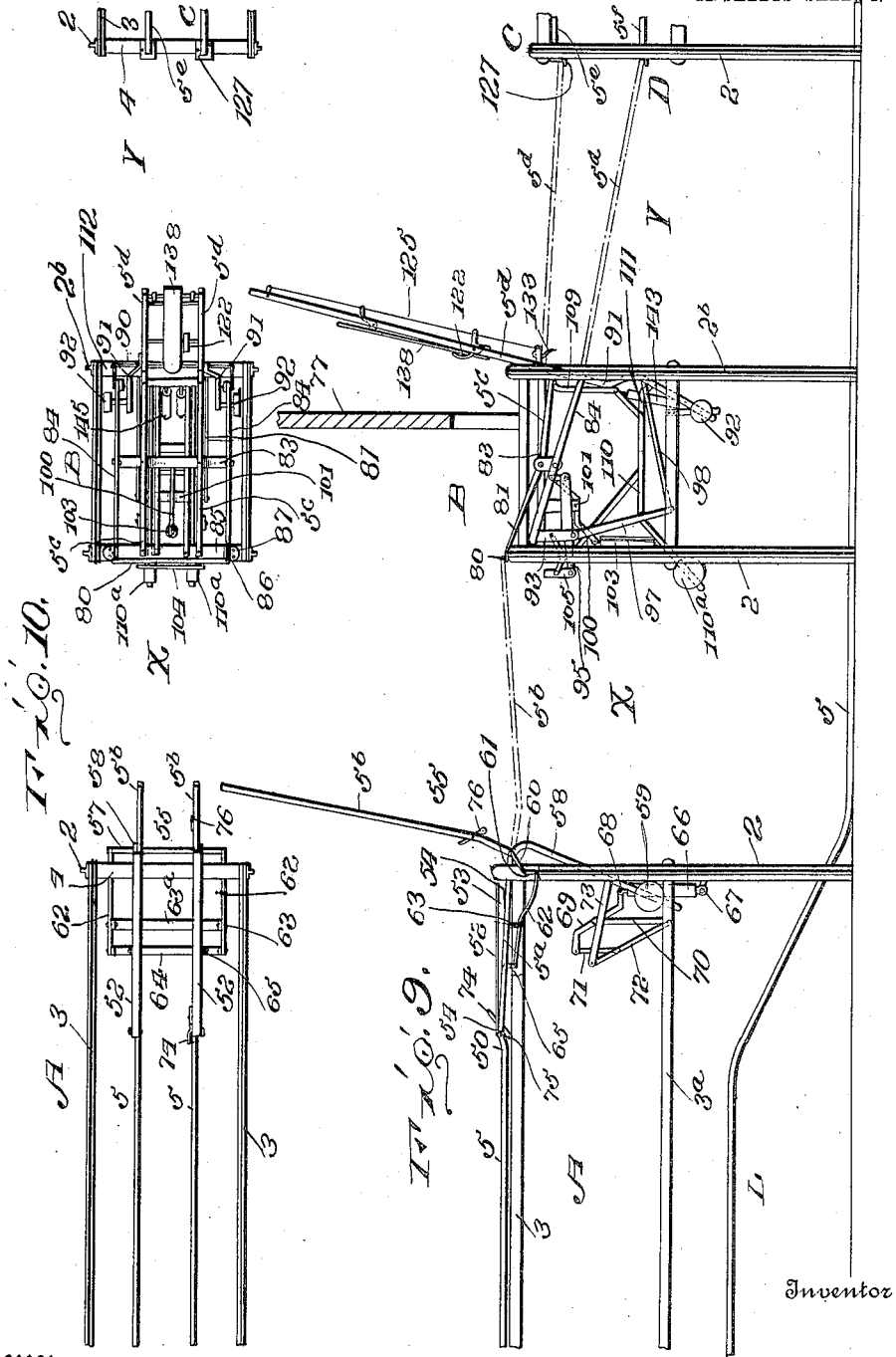

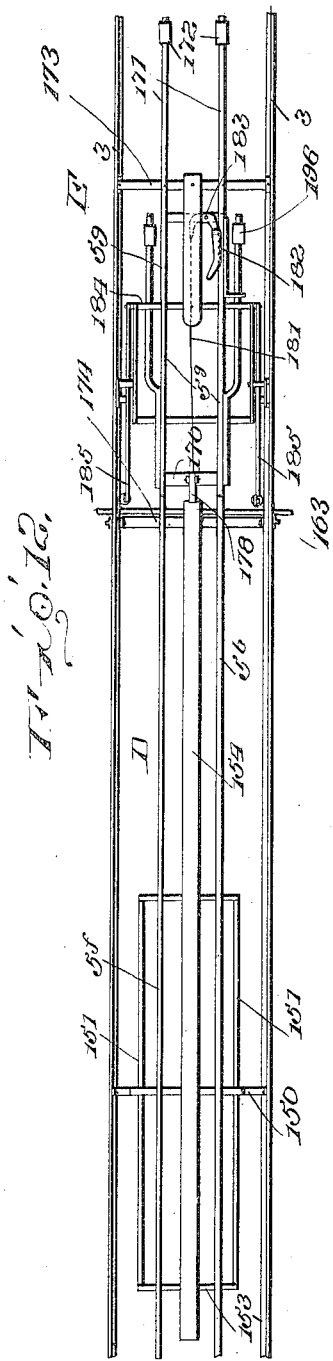
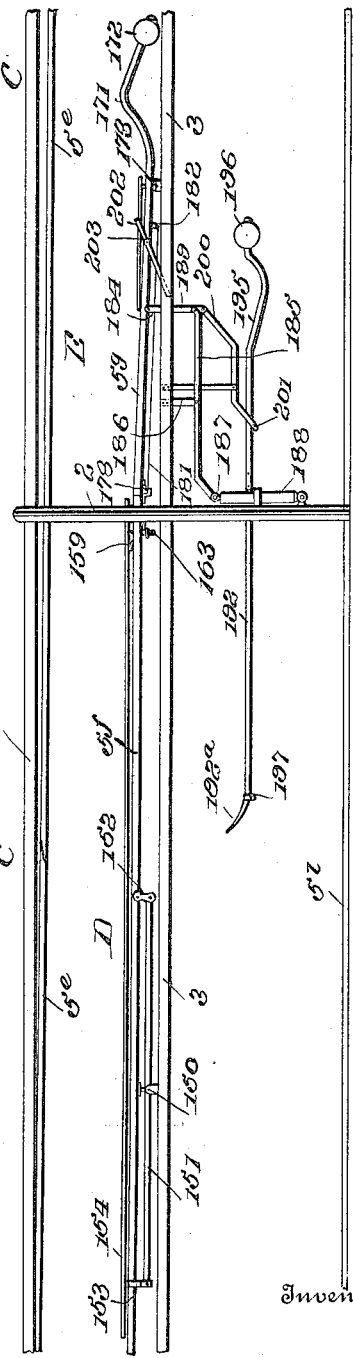

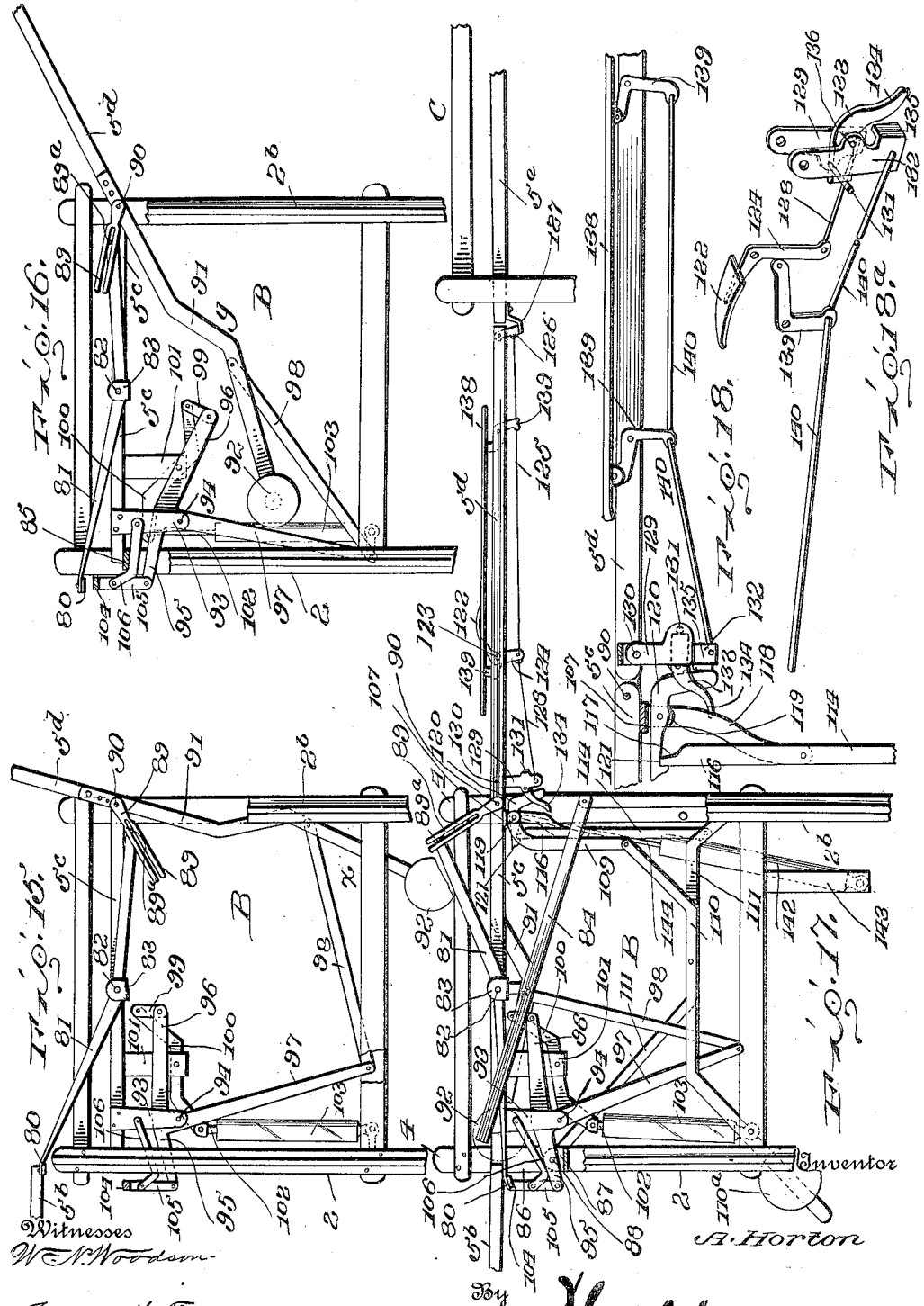

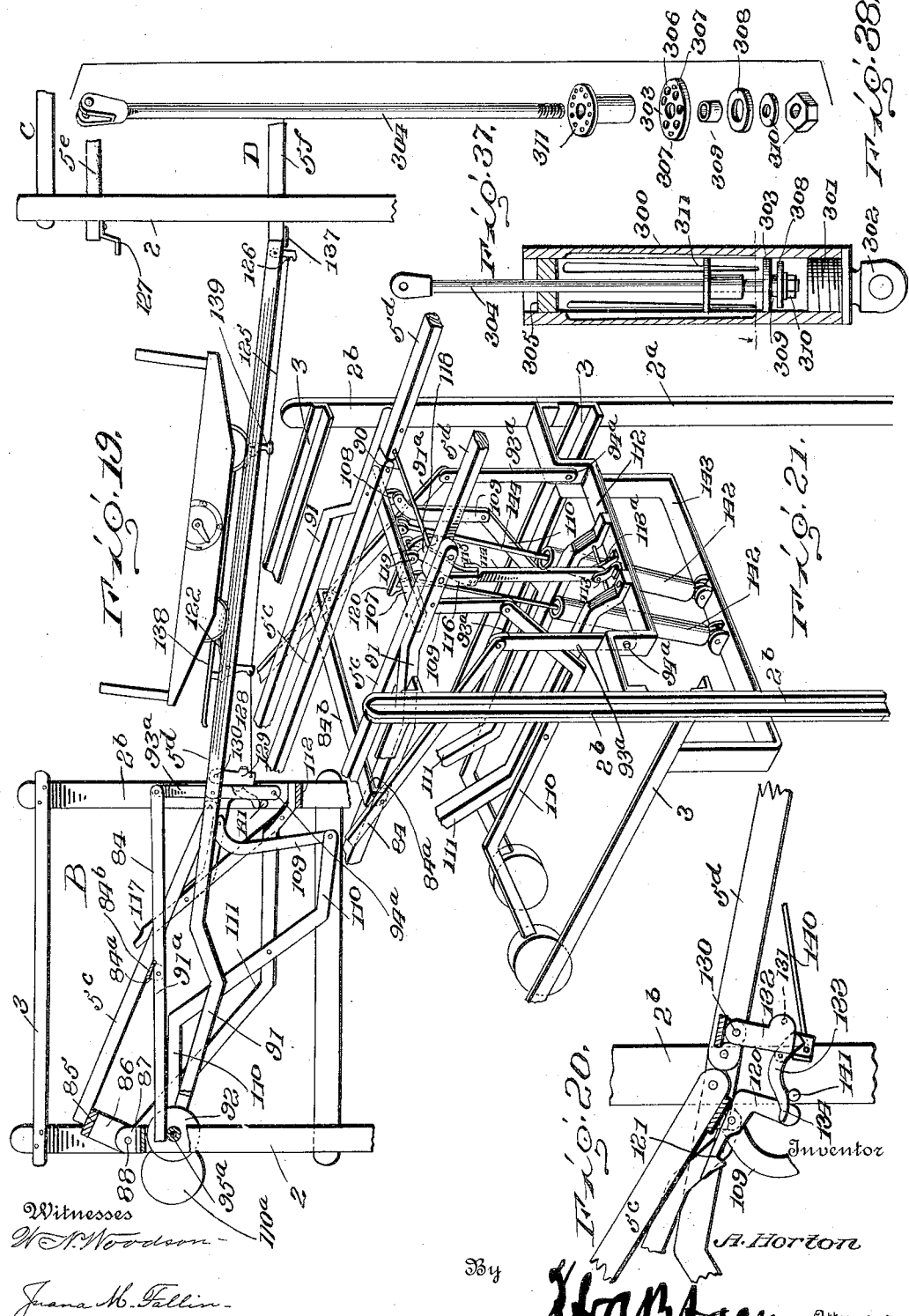

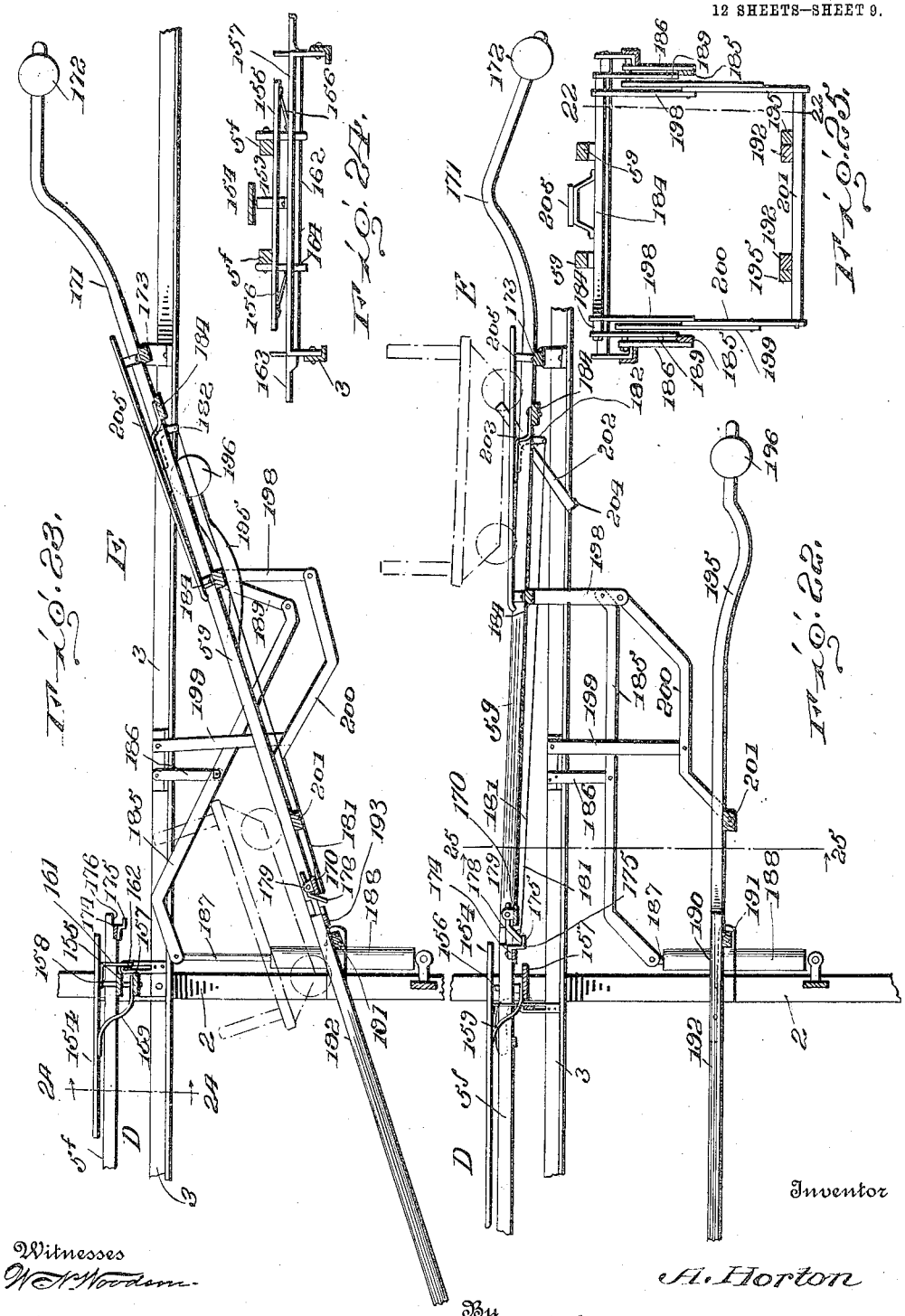

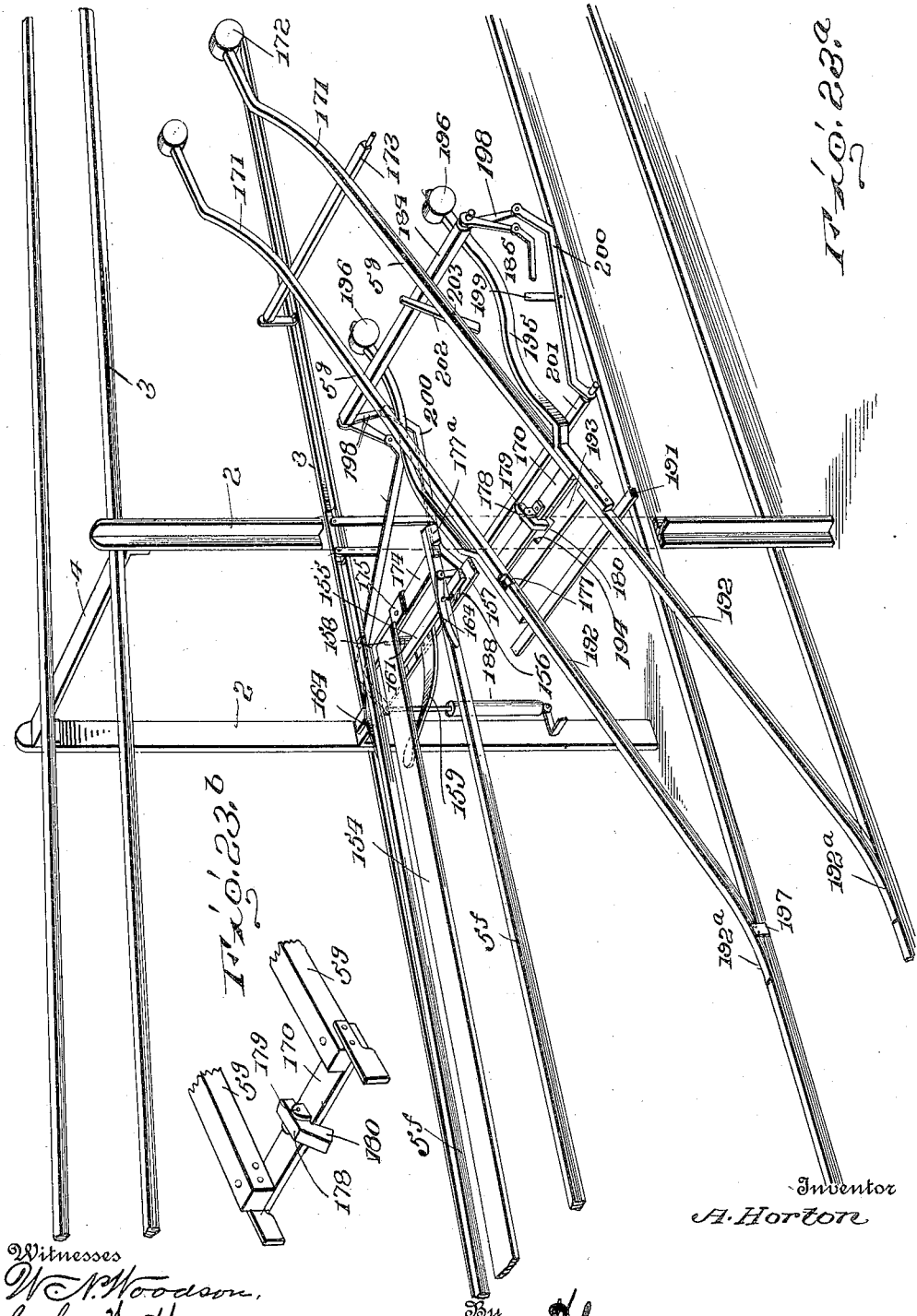

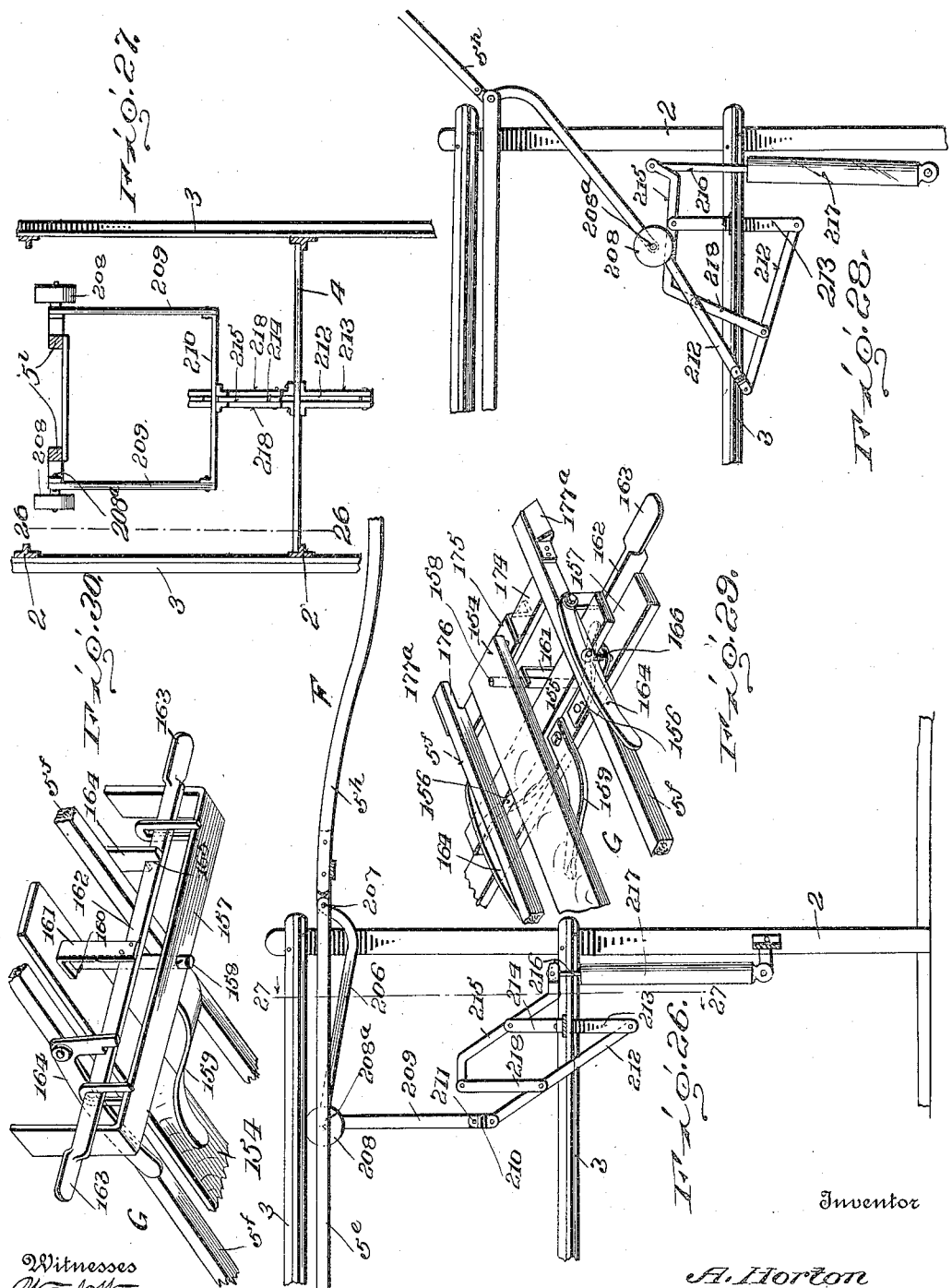

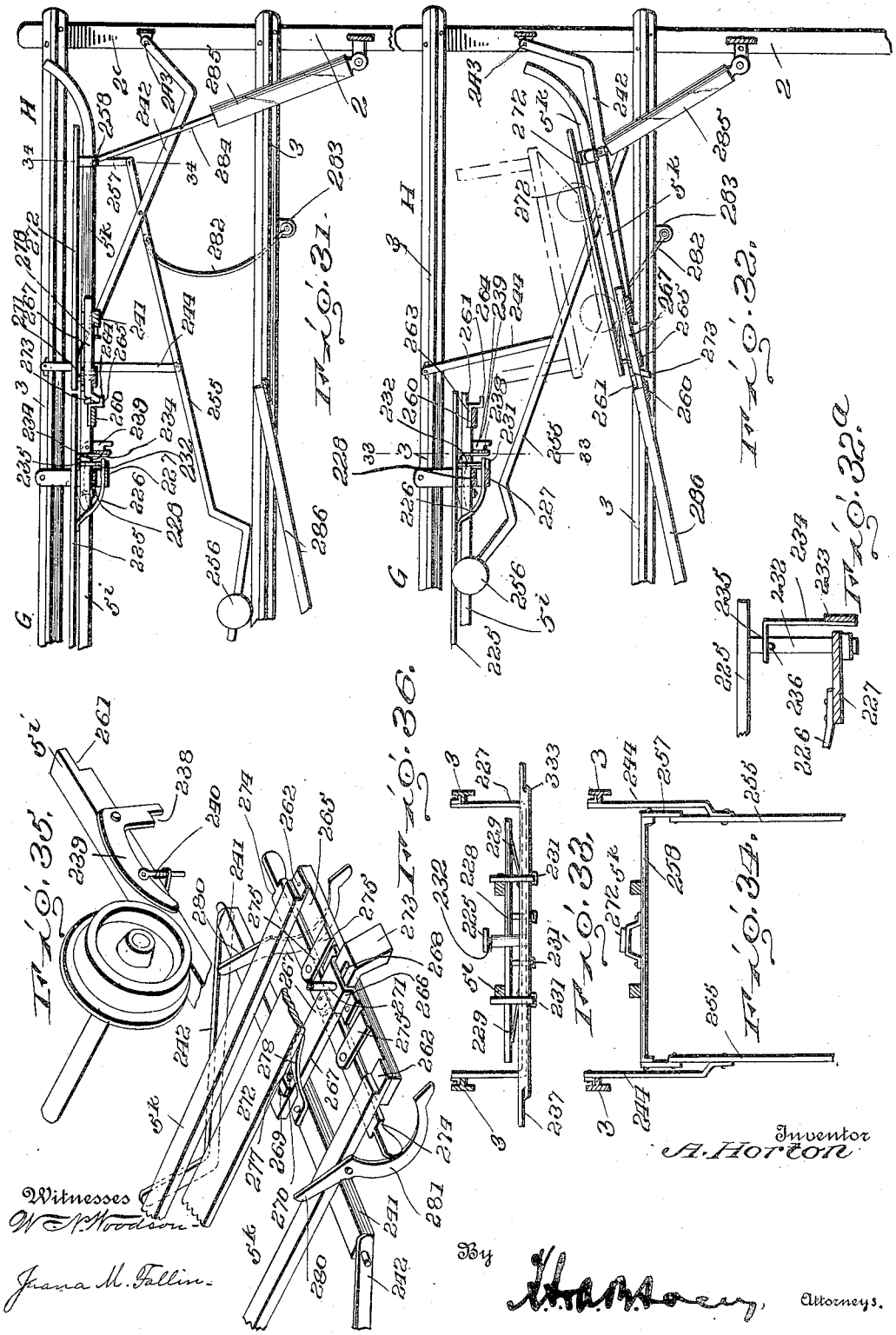

UNITED STATES PATENT OFFICE.

AARON HORTON, OF COLEMAN, MICHIGAN.

TRANSPORTATION SYSTEM.

1,070,472.

Specification of Letters Patent.  Patented Aug. 19, 1913.

Application filed April 21, 1911.  Serial No. 622,850.

*To all whom it may concern:*

Be it known that I, AARON HORTON, citizen of the United States, residing at Coleman, in the county of Midland and State of Michigan, have invented certain new and useful Improvements in Transportation Systems, of which the following is a specification.

My invention relates to means for transportation and particularly to a transportation system of that type wherein a carriage moves along a track, the track being provided at intervals with switches whereby the cars or carriages may be shunted off upon sidings or unloading sections of track from which the cars may be returned to their starting point.

The primary object of my invention is the provision of a transportation system of this character, particularly adapted to be used in hotels, cafés, summer gardens and other places of summer refreshment, and particularly designed for carrying food, plates, tableware, etc., from a kitchen or distributing point to the dining room or serving room and returning same thereto. While my invention is particularly designed for this purpose, it is not limited to this use as it is obvious that it might be used for a variety of purposes and might be used for transporting passengers, small freight or other commodities.

A further object of the invention is the provision of a transportation system including a track, the track being formed at intervals with normally open passageways permitting waiters or other persons to pass from one side of the track to the other without going over or under the track, these passageways being automatically closed by bridges or gates upon the approach of a car, the bridges or gates rising to their normal position after the car has passed.

A further object is the provision in a transportation system of this type of automatic switches operated by means on the car whereby the car may be automatically made to take any predetermined switch and so be automatically directed to any desired unloading point, the cars moving along the track by gravity.

A further object is the provision in a gravity conveyer of this character of automatic means for stopping the cars at desired points and preventing a rear car from butting into a car in front.

A further object is the provision of a car to be used in a transportation system of the character described having thereon means which may be adjusted to operate any desired switch for shunting the car onto any desired section of the track.

A further object is the provision in a transportation system of the character described and provided with passageways and bridges normally open but adapted also to bridge said passageways, of means for closing the gates or bridges over the passageways upon the approach of a car, means for initially starting the car, means for shunting the car to any desired side track or permitting the car to continue to the end of the line, means for shunting the cars to a return track, and means for moving the cars from the return track to their starting position.

My invention is illustrated in the accompanying drawings wherein: Figure 1 is a plan view of a car such as will be used with my improved system of transportation. Fig. 2 is a section on the line 2—2 of Fig. 1. Fig. 2$^a$ is a side elevation of the car. Fig. 3 is an end elevation of the car. Fig. 4 is a detail elevation of the means for depressing the switch actuating members. Fig. 5 is a fragmentary perspective view of the starting section of the track. Fig. 6 is a diagrammatic view of a complete track system showing the various gates and switches. Fig. 7 is a side elevation of the starting section of the track and the means whereby the car is elevated from the terminal of the return track to the starting section. Fig. 8 is a plan view of the section of track shown in Fig. 7. Fig. 9 is a side elevation of the starting section, the gate connected thereto, the combined switch and gate forming the next section of the track, and a portion of the following section. Fig. 10 is a plan view of the parts shown in Fig. 9. Fig. 11 is a side elevation of a section of the main track and the intermediate unloading terminal and switch. Fig. 12 is a plan view of the parts shown in Fig. 11. Fig. 13 is a side elevation of a portion of the main track, the gate connected thereto, and the final terminal for the main track with its return switch. Fig. 14 is a plan view of the parts shown in Fig. 13. Fig. 15 is an enlarged side elevation of the gate actuating mechanism illustrated in Fig. 9. Fig. 16 is a like view to Fig. 15 but showing the gate or bridge partly lowered. Fig. 17 is a side elevation of the apparatus for operating the combined gate and switch showing the position of the parts after the gate is depressed to a horizontal position. Fig. 18 is a side elevation of a portion of the switch operating structure showing the latches whereby the rails of the gate are held in their horizontal position until tripped. Fig. 18ᵃ is a perspective view of the tripping mechanism shown in elevation in Fig. 18. Fig. 19 is a side elevation of the parts shown in Fig. 17 but showing the gate depressed so as to constitute a switch leading to the first unloading section or terminal. Fig. 20 is an enlarged side elevation of a portion of Fig. 19 showing the position of the latch when the gate is fully depressed. Fig. 21 is a fragmentary perspective view of the parts shown in Fig. 19. Fig. 22 is an enlarged longitudinal sectional view taken on the line 22—22 of Fig. 25, showing the return switch for the first unloading terminal in its raised position. Fig. 23 is a like view to Fig. 22 showing the switch depressed to shunt a car from the unloading terminal to the return section of the track. Fig. 23ᵃ is a perspective view of the switch shown in Fig. 23 and a portion of the unloading terminal and a portion of the return track. Fig. 23ᵇ is a fragmentary perspective view of the end of the switch showing the guides thereon. Fig. 24 is a vertical section on the line 24—24 of Fig. 23. Fig. 25 is a vertical section on the line 25—25 of Fig. 22. Fig. 26 is an elevation of the hand operated bridge or gate for connecting two sections of the main track, the view being taken on the line 26—26 of Fig. 27. Fig. 27 is a vertical section on the line 27—27 of Fig. 26. Fig. 28 is a view corresponding to Fig. 26 but showing the gate partially raised. Fig. 29 is a perspective view of the forward end of the main track section G looking from above. Fig. 30 is a perspective view of the same parts as in Fig. 29 but looking upward from below. Fig. 31 is an enlarged vertical section of the terminal end of the main track, the terminal switch being raised. Fig. 32 is a like view to Fig. 31 but showing the switch in its depressed position. Fig. 32ᵃ is a detail sectional view of the means for depressing the brake plate 225. Fig. 33 is a section on the line 33—33 of Fig. 31. Fig. 34 is a vertical section on the line 34—34 of Fig. 31. Fig. 35 is a detail perspective view of one of the latches for holding the forward ends of the brake plate down in a depressed position. Fig. 36 is a perspective view of the rear end of the terminal switch section. Fig. 37 is a vertical section enlarged of one of the cushioning cylinders. Fig. 38 is a perspective detail view of the internal mechanism of the cushioning cylinders, the parts being detached from each other.

Corresponding and like parts are referred to in the following description and indicated in all the views of the accompanying drawings by the same reference characters.

In order that my invention may be readily comprehended, it is best to begin the description with the point whereat the cars are started, it being premised, however, that the track structure is very simple and preferably consists of vertical supporting standards 2 of T iron set at intervals on opposite sides of the track and connected by longitudinal stringers 3 and by transverse braces 4. I have shown this form of construction as being one well adapted for the purpose I have in view, but it is to be understood, of course, that I may use any other desired form of supporting structure. On the transverse braces are supported the rails 5 upon which the car moves.

In order to fully understand the operation of the various switches, gates, bridges, etc., it is best to have an understanding of the car structure itself before proceeding to the track structure. Generally speaking, the car is provided with a switch actuating member or members disposed below the car and normally carried in the same plane as the rails upon which the car runs, these members being so arranged that they may be set to actuate any one of the various switches. The car is also provided with a brake structure which also depends between the rails of the track and is adapted to engage with certain brake plates located between the rails as will be more fully described later.

Referring now to Figs. 1 to 4 which show the detailed construction of the car, 1 designates the body of the car which may be of any suitable form or construction. The truck upon which the car is supported comprises a rectangular frame 7 of angle iron through which pass the axles 8 carrying the wheels 9. It will be seen from Fig. 3 that these wheels are considerably wider than the track rails 5. Each of the wheels is provided with a flange on its inner face as usual. The axles 8 are preferably supported in ball bearings so that the wheels may turn with the least friction possible. The frame of the truck at the ends of the truck are provided with the U-shaped straps 10, as illustrated in Fig. 3, and attached to the under side of the body of the car adjacent the ends thereof are the members 11 having downwardly turned ends 12, the extremities of said downwardly turned ends being continued parallel to the under face of the car and inserted within the straps 10. Attached to the end members of the truck 7 are the upwardly bowed springs 13, which springs at their ends are slightly curved in a reverse direction to the ends 12 of the members 11 and extended into the straps 10 so as to extend beneath the terminal ends 12 of the members 11. The car is thus supported upon the springs 13 so that all jar and shock is taken up. This is a preferable construction but I do not wish to be limited to it as it is obvious that the car might be supported in other ways.

The wheels 9 are each provided with a brake shoe 15. Each shoe is attached to an arm 16 which extends upwardly and is in turn attached to a rock shaft 17. There are two of these rock shafts, one located at each end of the car and supported in suitable bearings upon the frame 7 of the truck. The arms 16 at their upper ends are formed with square collars 18 which fit around squared portions of the rock shaft 17 and are held in place by means of set screws 19. Attached to the middle of each of the rock shafts 17 is an arm 20. These arms extend toward the middle of the car and at their ends are provided with perforated heads 21. Through each perforated head passes a plunger 22 which is provided with a tension adjusting nut 23 and which at its lower end is pivotally connected to a brake plate 24. This plate is disposed horizontally and has upturned ends 25, the upper face of the brake being provided with lugs whereby it is attached to the plungers 22. Surrounding the plungers 22 is a coil spring 24$^a$ which, at its upper end, bears against a washer disposed against the lower face of the head 21 and at its lower end bears against a washer, which in turn bears against the nut 23. It will thus be seen that the plungers 22 are forced downward by the springs 24$^a$ relatively to the arms 20 but may move upward against the force of the springs. The upper ends of the plungers 22 are provided with nuts 26 which limit the downward movement of the plungers. The perforations in the heads 21 are slightly flared and the washers 27 which are interposed between the heads 21 and the nuts 26 are rounded and fit in rounded recesses in the upper faces of the heads 21, thus permitting a certain amount of play to the plungers.

Preferably and in order to strengthen the plungers and provide an effective guide for the same, I may form the arms 20 with the downwardly extending brackets 28 to which is pivoted an arm 29 which has pivotal engagement at one end with the lower end of the plunger, the end of the arm 29 being bifurcated. It will be seen that the flared perforation in the head 21 permits the plunger to rock slightly and thus permits the pivotal engagement of the arm 29 with the plunger. The springs 24$^a$ are relatively strong but yield when a pressure greater than normal is brought to bear against the brake plate 24, as will be hereafter explained.

The switch operating mechanism consists of a shoe or plate, one for each switch in the main track horizontally disposed and carried beneath the car and having upturned ends, this shoe being designated 30. I have shown two of these shoes 30, 30$^a$, located one on each side of the brake shoe or plate 24, as illustrated in Fig. 1, but the number will depend on the number of switches in the main track. Preferably each switch shoe 30 is braced by a tension rod 31 (see Fig. 4) which extends along the brake shoe and is attached at its ends thereto, the middle portions of this bowed tension rod 31 resting upon struts 32. This prevents the switch shoe 30 from yielding and holds it rigidly in place while permitting it to be made very light. The opposite ends of each switch shoe 30 are provided with the upwardly extending standards or posts 33 which are received in and are freely shiftable in the downwardly depending sockets 34 which are attached to the bottom of the car body 1. These sockets 34 are longitudinally slotted as at 35.

Mounted upon brackets 36 downwardly depending from the car bottom, are the bell crank levers 37, one for each post 33. The outer extremities of these bell crank levers are slotted as at 38 (see Fig. 4), and a pin or bolt 39 passes through the slot 38 and into the upper end of the post 33, this pin or bolt 39 being capable of movement with relation to the slot 38. It is obvious that when the bell crank levers are moved in one direction, the post 33 will be raised and when moved in the other direction, the post 33 will be depressed and that thereby the switch shoe 30 may be adjustably raised or lowered, either into position to engage a switch or out of such position.

For the purpose of operating the bell cranks 37 and thus adjusting the switch shoe 30, I provide the transversely extending shaft 40 which is mounted in suitable bearings in downwardly depending webs or aprons 41 depending from the sides of the car body. The opposite ends of this shaft 40 are provided with the pointers 42, each pointer 42 moving over a dial 43, this dial having upon it characters indicating the various switches disposed along the length of the track (see Fig. 2$^a$). In the instance shown, the dial is provided with numerals 1, 2 and 3, the numerals 1 and 2 being opposite each other and the numeral 3 being located in the middle of the dial. This dial is not completely circular but is arcuate. The shaft 40 has upon it the disks 44 and 45. Each of these disks is the same and each is provided with the oppositely disposed projecting wrist pins 46. Links 47 connect each of these wrist pins to a wrist pin mounted upon the inner end of the bell crank lever 37. The inner ends of these links 47 are angularly disposed with relation to the body portion of the links so as to permit the inner ends of the links to lie parallel with each other when in the position shown in Fig. 4.

Referring particularly to the disk 44, it will be seen that when the disk is rotated in the direction of the arrow (Fig. 4), the links will be forced outward, thus raising the outer ends of the bell crank levers 37, and that when the disk 44 is moved in a clockwise direction the links will be retracted and thus act to depress the outer ends of the levers 37 and the posts 33. As before remarked, there are two of these disks 44 and 45, both having the same construction, both connected to pairs of links 47, which in turn are connected to the bell cranks 37, the posts 33 and a switch shoe 30. The only difference between the disk 44 and the disk 45 is that the wrist pins 46 are oppositely disposed to each other so that when the disk 44 moves in the direction of the arrow and thus acts to raise the post 33, the wrist pins upon the disk 45 will act to draw the links 47 toward each other and thus depress the switch shoe 30$^a$ attached thereto.

It will be seen that when the pointer 42 is in the position illustrated in Fig. 2$^a$ and pointing toward number 1 on said figure, the switch shoe 30 will be depressed, while the switch shoe 30$^a$ will be raised. When the pointer has been turned to the position 3, neither of said brake shoes will be either fully raised or fully depressed, but the shoes will be supported in a middle position where neither of the shoes will actuate a switch. When, however, the pointer 42 has been turned to the numeral 2, then the switch shoe 30$^a$ will be fully depressed and the switch shoe 30 will be raised. These switch shoes 30 and 30$^a$ actuate the automatic switches whereby the car is shifted from the main track to the side track.

Figs. 5, 8 and 9 show the starting section A of my transportation system. As before explained, the rails are supported upon a supporting frame comprising the uprights 2, the longitudinal members 3 and the transverse members 4, which in turn support the rails 5. The rails 5 of the starting section of the track A are very slightly downwardly inclined and in the illustration are shown as downwardly inclined toward the right hand end of the sheet. Near the end of the starting section, the rails 5 are slightly upwardly turned as at 50 and are then extended slightly downward as at 5$^a$. Pivotally mounted upon the faces of the rails are the false rails 52, these having side flanges 53 (see Fig. 5), these flanges terminating short of the extremities of the false rails and the extremities of these false rails being beveled as at 54 (see Fig. 9). The false rails are adapted to be raised from the main rails or to be lowered thereto. The reason for providing the false rails 52 is that immediately in advance of the starting section A there is a transverse passageway X, permitting waiters to pass from one side of the room to the other without having to go over the track structure or beneath it. In order to bridge this passageway and carry the cars from the starting section A to the next section, B, I provide the bridge or gate 55. This bridge or gate comprises two parallel slightly bowed rails 5$^b$ attached at their inner ends to a rock shaft 57 carried upon the ends of the portions 5$^a$ of rails 5. Extending rearward from the rock shaft 57 are the arms 58, and carried by the lower ends of these arms are the counterweights 59 which normally hold the gate 55 in an approximately vertical position.

Attached to the rock shaft 57 are the crank arms 60, each crank arm being connected by a link 61 to a lever 62 slightly angular in form and pivoted at 63 to a cross bar 63$^a$ depending from the portion 5$^a$ of each rail 5. The rear end of each lever 62 is connected to a cross bar 64, which in turn is connected by links 65 to the false rail 52. Thus both the false rails 52 are connected to the cross bar 64, and this in turn is connected to the inner ends of the levers 62. It will be seen that with this construction when a car is rolled upon the pivoted false rails 52, the weight of the car will depress these rails so that the tread of the rails 52 will be lowered upon the tread of the rail portions 5$^a$, and that this lowering action will depress the rear ends of the levers 62 and raise the outer ends of the levers, thus rotating the rock shaft 57 and shifting the bridge 55 from the position shown in full lines in Fig. 9 to the position shown in dotted lines in Fig. 9, so that the car which is resting upon the false rails 52 will roll off these false rails and onto the bridge rails 5$^b$. The weight of the car holds the bridge rails depressed but when the car moves off the bridge rails, the counterweights 59 will raise the bridge to its former position.

For the purpose of preventing any jar, shock or noise due to the opening or closing of the gate or bridge 55, I connect the extensions 58 of the bridge rails 5$^b$ with a fluid cushion device which operates to reduce this shock or jar, either upon an upward movement of the arms 58 or upon a downward movement thereof. The detailed construction of this cushion or buffer will be later described. It is sufficient, however, to say that as illustrated in Fig. 37, the buffer 66 consists of a cylinder pivotally supported at its lower end upon a bracket 67, within which cylinder moves a piston connected to a piston rod 68. This piston rod 68 is in turn connected to a lever 69, having angular terminations, which is pivoted at its middle upon a bracket 70. The outer end of this lever 69 is connected by a link 71 to an arm 72 pivoted to one of the longitudinal members 3ª, the upper end of this arm being connected by a link 73 with the extension 58 of the bridge rail 5ᵇ. There are two of these cushioning devices and it will be obvious that when the bridge 55 is depressed to its dotted line position, the arms 58 will cause the arm 73 to rise, thus depressing the arm 72 and raising the forward ends of the levers 69, thus raising the plungers within the cylinder 66. The piston does not cushion upon the up stroke but is fully raised by a half stroke of the gate either from a horizontal or a vertical position and by the other half stroke the piston is fully depressed. Thus the piston makes a full upward and a full downward movement for each full movement of the gate, either down or up, and the cushion is fully depressed when the gate is fully open or fully closed.

In order to hold the car upon the false rails 52 while the gate or bridge is being lowered, I provide the pivoted detents 74 which are pivoted at their middles and have weighted ends 75 which act to throw the detents upward and into position to be engaged by the car wheel. The bridge rails 5ᵇ are also provided with the pivoted detents 76 constructed on the same principle as the detents 74 and preventing any backward movement of the car.

It will be seen that when the rails 5ᵇ are in their upraised position they form a gate, permitting the passage of persons through the track. When the rails 5ᵇ, however, are turned down, they permit the car to run forward along the rails and eventually onto a combined switch and gate or bridge as will be now described.

77 (Fig. 9) designates a partition dividing for instance the kitchen or loading room from the serving room or dining room. Inasmuch as it is desirable to have a passageway X at the end of the kitchen and a passageway Y at the adjacent end of the serving room, the necessity of placing two gates or bridges to extend across these passages in proximity to each other will be obvious. The part now to be described, as before stated, forms not only a bridge spanning the first passageway in the dining room or serving room, but also forms a switch whereby the cars may be either directed along what may be termed a main track, or directed to an unloading track which is practically what may be termed a side track, although it is located below the main track in order to economize room, the main track being the upper track while the unloading tracks and return tracks are disposed immediately below the main track. I have designated this combined switch and gate as B in order to distinguish it from the other elements of my transportation system. The main track succeeding the gate B I have designated C and the unloading or side track upon which the cars may be directed, if desired, I have designated D (see Fig. 9).

It will be obvious from Fig. 9 that the gate or bridge connected to the part B must be shifted automatically, either into position to direct the cars along the main track C, in which position it simply acts as a bridge or gate in the same manner as the bridge or gate 55, or it must be turned down into a position so that the rails of the gate or switch connect with the rails of the section D. For the purpose of moving the gate of the portion B automatically into line with the main track rails of the section C, I have devised the following mechanism.

Projecting into the path of movement of the extremities of the rails 5ᵇ of the bridge 55 is a cross bar 80 which is carried upon the inner extremities of angular levers 81 which are pivoted at 82 to a bracket 83 attached to rails 5ᶜ. To this bracket is also pivoted a lever 84 whose purpose will be later described. The rails 5ᶜ are attached at their rear ends to a U-shaped support 85, the downwardly extending legs 86 of which are pivotally mounted upon brackets 87 attached to cross bar 4, the supporting member 85 being pivotally mounted by means of bolts 88. It will be seen from Figs. 17 and 19 that the supporting member 85 projects rearward beyond the rear ends of the rails 5ᶜ so as to support the ends of the rails 5ᵇ when the rails 5ᵇ are fully depressed, thus permitting the car to run from the rails 5ᵇ onto the rails 5ᶜ. The forward extremities of the levers 81 are pivotally connected preferably by a pin 89ª to slotted arms 89 attached to a rock shaft 90.

Mounted upon the rock shaft 90 are the rearwardly extending arms 91 carrying at their ends the counterweights 92. Also attached to the rock shaft so as to swing therewith are the bridge rails 5ᵈ, these rails being of course carried in alinement with the rails 5ᶜ. It will be obvious now that when the car runs out upon the rails 5ᵇ and depresses the gate 55, the rails 5ᵇ contacting with the cross bar 80, will depress the rear ends of the levers 81, and that the elevation of the forward ends of the levers 81 will cause a rotation of the rock shaft 90 which will swing the rails 5ᵈ downward into the position shown in Fig. 17, and that when the car has run off the rails 5ᵈ, the counterweights 92 will return the rails 5ᵈ to their normal position.

It is necessary to provide means for preventing the slamming of the gate or bridge in moving to its closed position, and it is also necessary to provide means for positively closing the rails 5ᵈ into engagement with the track section C. To this end I attach to the rear ends of the rails 5ᶜ the depending brackets 93, upon which are pivoted the levers 97, each carrying at its upper end a rearwardly projecting arm 95 and a forwardly projecting arm 96. The lever 97 is relatively long and extends downwardly and is pivoted at 94. Each lever 97, at its lower end, is connected by a link 98 to one of the rearwardly extending arms 91 near the lower end thereof. Thus it will be seen that a movement of the arms 91 will be communicated by the links 98 to the levers 97. The arms 96 of the levers 97 are connected by links 99 to an angular lever 100. This lever extends rearwardly and downwardly and is pivoted at its middle upon a bracket 101. The rear end of the lever 100 is connected to the piston rod 102 of a cushioning cylinder 103 constructed as hereinafter described. It will be obvious now that a movement of the arms 91 to the position shown in Fig. 16 will cause the levers 97 to rotate upon their pivots and will cause a depression of the extremity of the arms 96. This draws downward upon the links 99 and upon the forward end of the lever 100, thus raising the piston rod 102. It will be seen from Figs. 15 and 16, however, that a half movement of the arm 91 from the position x to the position y will move the lower end of the lever 97 to its full rearward position, and that a further movement of the arm 91 carrying the pivotal connection of the links 98 to the position shown in Fig. 17 will cause a retraction or forward movement of the lower end of the lever 97, so that thus the piston in the cushioning cylinder will be first raised and will then be depressed. This cylinder is a double acting cylinder and acts in the same manner as the cylinder 66 previously described. The piston rod 102 is raised until the gate has reached the middle of its arc of movement, moving from either direction, whereupon a further movement in the same direction will cause the piston to be depressed.

By reason of the peculiar construction, the weight of the car upon the levers 81 will not act to fully depress the gate to its vertical position, but the parts will be shifted to the position shown in Fig. 16. For the purpose of positively moving the gate to its full position, I provide a cross bar 104 which is carried upon the vertical members 105, this cross bar being supported in a plane immediately in advance of the cross bar 80. The vertical members 105 are attached to the ends of arms 95 of the levers 97, and these vertical members are connected to the bracket 93, each by means of an angular link 106.

It will thus be seen that as the arms 95 are raised by the rearward movement of the lever 97, the cross bar 104 will be raised into such position as to be engaged by the ends of the gate rails 5ᵇ so that as these rails 5ᵇ are fully depressed, they will engage with the cross bar 104, and when the weight of the car comes fully upon the members 105 these members will be depressed, raising the lower ends of the levers 97 and forcing upward on the links 98 which at this point are in the position shown in Fig. 17. This upward movement on the links 98 will cause the rear ends of the arms 91 to rise further and thus more fully depress the rails 5ᵈ into alinement with the rails 5ᵉ of the track section C. Where it is not intended to operate the gate section B at a switch, the car will simply roll outward upon the rails 5ᵈ without affecting any other mechanism and will pass onto the rails 5ᵉ of the section C of the main track. After the car has passed, the counterweights 92 will act to return the bridge rails 5ᵈ to their upraised or normal position, thus leaving the passageway Y between the sections B and C and D open.

In order to provide for automatically shifting the rails 5ᵈ into alinement with the rails 5ᶠ of the unloading section D, I provide the following instrumentalities. As before stated, the rear ends of the rails 5ᶜ are mounted upon the U-shaped member 85 which is pivoted at 88. Thus the forward ends of the rails 5ᶜ are adapted to be depressed and to carry with them the rails 5ᵈ, the rock shaft 90 upon which the rails 5ᵈ are supported being mounted in brackets depending from the rails 5ᶜ or being otherwise hingedly supported upon the rails. Depending below the forward ends of the rails 5ᶜ is a cross piece 107 upon which are mounted depending ears 108. To these depending ears are pivoted the downwardly extending links 109 which at their lower ends are pivotally connected to the forward ends of levers 110, these levers being angularly bent at their ends so that the forward and rear ends of the levers are parallel. The levers 110 at their rear ends extend downward and rearward and are pivoted each at its middle to a bracket 111 connected to the adjacent supporting post 2 at the rear end of the section B by means of a transverse brace directly mounted upon the posts. The forward ends of the brackets 111 are mounted upon a transverse yoke 112. With this construction it will be seen that when the weight of the car is exerted upon the rails 5ᵈ, the rails 5ᶜ and 5ᵈ will both be depressed to the position shown in Fig. 19. Hence means must be provided for holding the rails 5ᶜ and 5ᵈ in their horizontal position when lowered to the position shown in Fig. 17 and preventing any further depression of the rails, such means including a latch for holding the rails in a horizontal position and means whereby the latch may be tripped by one of the switch-actuating members 30 on the car.

Attached to the side vertical bars 2ᵇ is a yoke 112 as illustrated in Fig. 21. This yoke has a depressed central portion, to which the forward ends of the brackets 111 are attached. Pivotally mounted upon a transverse bolt 113, which is supported upon ears 113ᵃ, is an upwardly extending member 114 which I will term a stanchion. This member about midway of its length has an offset ear 115, and the upper portion of the member 114 above this ear is upwardly extended as at 116, the upper end of this extension 116 forming a locking member and being reduced as at 117, (see Fig. 18).

Pivoted to the ear 115 is a link 118 which forms part of the stanchion 114 and which, at its upper end, is pivoted in ears 119 depending from the cross bar 107. These two members 114 and 118 together form a two-part stanchion, two parts of the stanchion being jointed to each other so that they may turn into a position of approximate alinement or into an angular relation. Also pivoted to the ears 119 is a latch 120 which is angular in shape and the rear end of which is provided with a notch 121 engaging over the reduced end 117 of the member 116 which forms part of the stanchion 114. When the latch 120 is in engagement with the member 117, it will be obvious that the stanchion will be held from folding at the joint and that thus the rails 5ᶜ will be held in a vertical position, but that when the latch 120 is tripped so as to disengage it from the locking member 116, the stanchion will turn upon its pivot 113 to the position shown in Fig. 19, thus permitting the descent of the rails 5ᶜ and 5ᵈ to the position shown in Fig. 20 and against the resistance of the counterweights on the ends of levers 110.

The means for tripping this latch automatically by the car is as follows. Mounted between the rails 5ᵈ in position so as to be engaged by one of the switch actuating members 30 on the car is a rocker 122, this rocker being pivoted on a transverse bolt 123 or otherwise pivotally connected to the rails. The rocker is in the form of a bell crank lever and has a depending arm 124. A connection 125 extends from this depending arm to a catch 126 attached to the forward ends of the rails 5ᵈ, this catch normally engaging with a projecting lip 127 on the rails 5ᵉ. When the rocker 122 is depressed, it will draw upon the connection 125 and withdraw the catch 126 from its engagement with the lip 127 so as to permit the rails to descend. The arm 124 is also connected by a push and pull rod 128 to a depending arm 129 pivoted upon a bolt 130 extending through the rear ends of the rails 5ᵈ. This arm 129 is provided with a laterally projecting pin 131. Pivotally mounted beside the arm 129 and also pivoted to the bolt 130 is the depending arm 132 which carries upon it the pivoted trip 133 having the downwardly and rearwardly inclined extension 134. The forward end of the trip 133 is adapted to contact with the pin 131 when the parts are in their normal position. The lower end of the arm 132 has a rearwardly projecting enlargement 135 which is normally out of contact with the downwardly extending arm of the latch 120 but which when forced into engagement with this downwardly extending arm acts to turn the latch upon its pivot 136 and to withdraw the rear end of the arm 120 from its engagement with the detaining member 116. Now when the plate 30 upon the car strikes the rocker 122, it depresses the upwardly and forwardly extending rounded arm of the rocker and pushes upon the rod 128. This pushes the lower end of the arm 129 rearward, and this through the pin 131 communicates a rearward motion to the arm 132. The lower end of the arm 132 contacts with the lower end of the latch 120, thus raising the latch from its engagement with the detaining member 116, whereupon the lock being broken, the stanchion turns upon its pivot 113 to the position shown in Fig. 19 and the rails 5ᶜ and 5ᵈ are lowered until they contact with the lip 137 carried upon the rails 5ᶠ of the track section D.

In order to hold the car upon the track and prevent its moving down the track until the rails 5ᵈ have engaged with the lips 137, I provide a brake plate 138 which is attached to angular levers 139 pivoted to the rails 5ᵈ. This brake plate 138 is in position so that when it is upwardly raised it will engage the brake plate 24 on the car and stop the car by forcing upward on the brake plate 24 and throwing on the brake shoes 15, as before described. The plate 138 is automatically raised when the rocker 122 is depressed. When the rocker 122 is depressed, the rod 128 is pushed rearward which pushes rearward the arm 129, which through the pin 131 and the trip 133 pushes rearward the arm 132. This arm is connected by a rod 140 to the angular levers 139 so that when this arm 132 is pushed rearward, the connection 140 will force upward the brake plate 138. When the rails have been depressed to their fully depressed position shown in Fig. 19, the trip 133 will come in contact with a pin 141 (see Fig. 20) which raises the rear end of the trip and disengages it from the pin 131 and thus permits the plate 132 to move forward at its lower end, releasing the tension on the connection 140 and permitting the brake plate 138 to lower.

In order to support the rails 5ᶜ and 5ᵈ in a nearly horizontal position while the switch is being depressed, I provide the levers 84 which are pivoted to the brackets 84ᵃ attached to a cross bar 84ᵇ attached to rails 5ᶜ and depending therefrom. The forward ends of these levers 84 are pivoted to links 93ᵃ which are pivoted at their lower ends as at 94ᵃ (see Fig. 21) to the cross bar 112 so that the links may rock in vertical planes forward and back but prevent the forward ends of the levers 84 from rising. The rear ends of the levers 84 extend rearward and extend over rollers 95ᵃ which are mounted on pins projecting from the rear ends of the levers 91, these pins carrying the counterweights 92 as before described. It will be seen that as the rails 5ᶜ and 5ᵈ turn upon the pivot 88, the rear ends of the levers 84 will ride upon the rollers 95ᵃ and will prevent these rollers from rising. It will be obvious that because of the pivotal connection of the levers 84 with the rails, the levers will be bodily depressed and the rear ends of the levers 84 will travel downward with the rollers 95ᵃ and keep the extensions 91 of the rails 5ᵈ very nearly in a horizontal plane permitting the rails 5ᵈ to have a slight inclination downward and forward as shown in Fig. 19.

It will thus be seen that I have provided mechanism whereby the car may be either carried onto the main track or directed onto the switch or side track and that this mechanism is operated by the car itself, and that while the rails 5ᶜ and 5ᵈ are being lowered, the car will be held from any downward movement by means of the brake, but that when the rails have reached their lowest position, the brake will be automatically released, thus permitting the car to proceed onto the section D, and that as soon as the car has left the rails 5ᵈ, the counter-weights on the levers 110 will return the rails 5ᶜ and 5ᵈ to their original position and that as they do so the locking member 116 will move into engagement with the notch 121 and the trip 120, thus holding the parts in their raised position until another car comes along which has been arranged to actuate the switch.

In order to cushion the descent of the rails 5ᶜ and 5ᵈ, I have provided a pair of cushioning cylinders 142 which are pivoted at their lower ends upon a yoke 143 attached to the stringers 3, the upper ends of the cylinders being free to move in an arc of a circle. Pistons are carried within these cylinders as will be later described, and these are connected to piston rods 144 which are pivotally connected at their upper ends to the cross bar 107 as illustrated in Fig. 21. These are single acting cushions. The counterweights upon the ends of the levers 110 are just heavy enough to raise the switch and its connections when relieved of the weight of the car, but permit a light weight on the switch to overbalance the levers 110 and permit the switch to lower.

It is to be understood that the main track section C simply consists of the transverse supports upon which the rails 5ᵉ are mounted, these rails being slightly inclined in the direction of the terminal end of the railway so that the cars will glide gently down the incline. The unloading section D or siding, however, must be provided with means for positively stopping the car or cars running upon the siding or unloading section so as to prevent a shock when the car has reached the end of the section D, and means must also be provided whereby if there is a car upon the section the next succeeding car shall be braked or stopped before it can bump into the preceding car. Means must also be provided whereby the cars upon the siding may be returned to the starting point. The means for braking the cars and for preventing one car from bumping into another is as follows: Mounted upon a pivot shaft 150 which is supported upon the lower longitudinal members 3 are the levers 151, these levers being pivoted at their middle (see Fig. 11). The forward ends of the levers are connected by links 152 to a cross bar connecting the rails 5ᶠ, while the rear ends of the levers 151 are connected to a cross bar 153 which is upwardly raised at its middle to a point slightly above the tread faces of the rails 5ᶠ and supports the rear end of an elongated brake plate 154. The forward end of the brake plate 154 is resiliently supported as will be later described, and is also connected with means whereby this the forward end of the brake plate may be depressed to permit the car to move out upon a return switch. In order to have an understanding of this construction, however, attention is called to the means for mounting the forward ends of the rail sections 5ᶠ. The forward ends of these rail sections are mounted upon a cross bar 155 (see Fig. 24) which is supported by upwardly and outwardly extending spring leaves 156, the inner ends of these spring leaves being riveted to a supporting cross bar 157 attached to the side pieces 3, as illustrated in the sectional view Fig. 24. Hence it will be seen that as a car runs upon the rail sections 5ᶠ, the forward ends of the rail sections will be depressed. The forward end of the brake plate 154 is guided by a bolt 158 and is also so supported by means of an upwardly curved leaf spring 159 attached to the cross bar 157. The bolt 158 is a guide bolt and extends through the cross bar 157 (see Fig. 30). The upper end of the bolt 158 carries upon it a pin or collar 160. Engaged with the pin or collar 160 is a latching member 161, the upper end of this latching member being bent at right angles to the body of the latching member and being bifurcated so as to fit around the bolt 158 and above the pin 160, as shown in Fig. 30. The lower end of the member 161 is attached to a cross bar 162 which extends outward on each side beyond the track and is provided on its extremities with the handles 163.

Pivotally mounted upon the side faces of the rails 5$^f$ at the forward ends thereof are the bell crank trip levers 164, the rearwardly extending arms of these levers having rounded upper edges which project slightly above the track. The downwardly extending arms of these levers are notched as at 165 so as to engage over the cross bar 162 when the cross bar is depressed. The rearwardly extending ends of these trip levers (as shown in Fig. 29) are forced upward by means of springs 166 so that the depending arms of the levers, when the cross bar 162 is depressed, will be forced inward into engagement with the bar so as to hold it down, thus drawing downward upon the member 161, the pin 160, the bolt 158 and the forward end of the brake plate 154. It will thus be seen that the brake plate will be normally projected above the track and that as the car arrives upon the rails 5$^f$, the forward ends of these rails will be depressed, thus causing the brake plate 154 to engage with the brake plate 24 on the car. When, however, it is desired to release the car so that the car may move down the switch, it is only necessary to draw downward upon the handles 163 which will move the cross bar 162 into engagement with the notched ends 165 of the trip levers 164. The brake plate 154 will be held in this depressed position and allows the cars to pass off the switch. The brake plate 154 will remain in this depressed position until the next following car depresses the trip arms 164 and releases the cross bar 162 from its engagement with the lower ends of the trip arms, whereupon the spring 159 will force the brake bar or plate 154 upward.

As before remarked, the section D of the track is for the purpose of affording a terminal, as it may be called, or side track at which the cars intended for this portion of the serving room may be unloaded. It is necessary therefore to provide means whereby the cars may be switched from the section D and carried to a return track. This switch for shunting the cars from the section D to the return track is to be nominated generally E. The rails 5$^g$ of the switch E are connected at their rear ends by a cross bar 170. The rails 5$^g$ are extended at their forward ends and upwardly curved as at 171 and terminate in counterwights 172. These rails 5$^g$ are supported upon a rock shaft 173 mounted in any suitable manner upon the stringers 3. It will be seen that the counterweights 172 will normally hold the rails 5$^g$ in horizontal position in alinement with the rails 5$^f$.

The forward ends of the rails 5$^f$ are connected by a cross bar 174 having thereon the angular depending lip 175. The under faces of the forward ends of the rails 5$^f$ are cut away as at 176, while the upper faces of the rear ends of the rails 5$^g$ are cut away as at 177 so as to fit beneath the cutaway portions 176. The forward extremities of the rails 5$^f$ are also provided with the downwardly extending guides 177$^a$ which project beyond the ends of the rails and are laterally and downwardly inclined, as illustrated in Fig. 29. These flaring guides which have a divergent relation to each other act to guide the ends of the rails 5$^g$ into exact alinement with the rails 5$^f$ when the switch rises to its vertical position.

Mounted upon the cross bar 170 is a latch 178, this latch being pivoted upon lugs 179 and being provided with the depending rearwardly projecting portion 180. This depending nose 180 has a lug on its under face to which a flexible connection 181 is attached (see Figs. 22 and 23), this flexible connection extending forward between the rails 5$^g$ to any suitable position rearward of the rock shaft 173 where it is attached to a bell crank lever 182. One arm of this bell crank lever extends rearward adjacent to the inside face of one of the rails 5$^g$, and the edge of this lever is bowed or curved so that the flange on the car wheel engaging with this curved edge will rotate the lever upon its pivot 183, thus drawing upon the connection 181 and drawing inward upon the nose 180, thus releasing it from its engagement with the lip formed by the depending angle iron 175. Thus when a car is run out from the section D onto the section E, the wheel will actuate the trip lever 182 which will draw upon this connection, release the catch 178 from its engagement with the cross bar 174 or the lip depending therefrom and will permit the rear ends of the rails 5$^g$ to lower, thus raising the counterweights 172.

Attached to the under sides of the rails 5$^g$ is a cross bar 184 which extends out on each side beyond the rails and nearly to the vertical plane of the longitudinal connecting members 3. In order to cushion the switch and prevent its slamming when moved to the end of its travel in either direction, I provide the levers 185 which are mounted upon brackets 186 extending downward from the adjacent longitudinal members 3. The rear end of these levers are bent and are pivotally connected to the plunger rod 187 of a cushioning cylinder 188 which will be later described, these cylinders being supported in any suitable manner upon the vertical supports 2. The forward ends of the levers 185 are connected by links 189 to the cross bar 184. It will thus be seen that upon a depression of the switch rails 5ᵍ, the cross bar 184 will be lowered, thus lowering the forward ends of the levers 185 and raising the plungers 187. Upon an upward movement of the rails 5ᵍ, the reverse occurs and the plungers are lowered into the cylinders 188.

Mounted upon the adjacent supports 3, and preferably supported on forwardly projecting brackets 190, is a rock shaft 191 upon which are supported the forward ends of the switch points 192. The butts of these switch points project beyond the rock shaft 191. The butt ends of the switch points are connected by means of a cross bar 193 (see Fig. 23ᵃ), this cross bar projecting beyond the butt ends of the points 192 so as to receive and support the rear ends of the rails 5ᵍ when the rails 5ᵍ are in their depressed position. The middle portion of the cross bar 193 is cut away as at 194 to accommodate the latch 180.

Attached to the butt ends of the rails 192 are the extension arms 195 which are deflected laterally so that they have a somewhat divergent relation to each other and extend forward nearly to the rock shaft 173 but below the rails 5ᵍ. The ends of these extensions 195 are provided with counterweights 196. These counterweights normally act to keep the points 192 in their vertical position but permit the points to be depressed into position to engage with the return track rails. The lower ends of the points are U-shaped in section so as to fit over the return track rails and also slightly incline as at 192ᵃ so as to permit the car to gradually roll off onto the return track rails. The points are also each provided with depending spaced lugs 197 which engage with the return track rails so that the points and return track rails shall be held in alinement when the switch is lowered, these lugs being somewhat divergent so as to guide the points into proper alinement with the return track rails.

In order to move the switch points into a downwardly and rearwardly inclined position as shown in full lines in Fig. 23, I provide the ends of the cross bar 184 with the links 198. Depending from the longitudinal supports 3 are the links 199, and pivoted upon these links are the levers 200, these levers being angularly bent at their ends. The forward upwardly extending ends of each lever 200 is pivoted to one of the links 198, while the rear end of each lever 200 is pivoted to a cross bar 201 which extends transversely and is attached to the forward ends of the arms or extensions 195. It will thus be seen that when the rails 5ᵍ are turned upon the rock shaft 173 so that the rear ends of the rails are depressed, the downward movement of the links 198 will cause a depression of the forward ends of the levers 200. This will raise upward on the cross bar 201, which in turn will raise upon the arms 195, thus turning the points 192 upon the rock shaft 191 and depressing the rear ends of the points into engagement with the rail. When the car passes off the tracks 5ᵍ and the points 192, the weights 196 and 172 will cause the return of the parts to their original position.

In order to provide means for holding the car until the switch is fully open, I provide a stop 202 which is pivoted at 203 to one of the rails 5ᵍ, which stop has an outwardly turned rear end 204 projecting into the path of movement of the arm or extension 195. This stop 202 will engage with the wheel or any other desired portion of the car and prevent the car from rolling down the inclined switch points until the switch has been fully depressed when the rear end of the stop 202 will engage with the arm 195, and the arm will be shifted into alinement with the rail, thus permitting the car to move down the rails 5ᵍ and the points 192 onto the return rails.

In order to slacken the speed of the car and so prevent the car from running on the upwardly rounded portions of the extensions 171 of the rails 5ᵍ, I provide the brake actuating plate 205 which is located between the rails and is supported on the cross bars 184 and 173. The plate 205 is so supported that it is inclined upward and forward. This plate will contact with the brake actuating plate 24 on the car and set the brakes as the car moves forward but will permit the car to move down the rails 5ᵍ when these rails are inclined downward and rearward.

It will be understood that the combined switch and gate B, the unloading track section and the return switch E may be used anywhere along the length of the track so as to provide for the passage of a car, either along the main track to some distant point, or from the main track to an unloading track and from the unloading track to the return track. I have only shown one set of the sections B, C, D and E but I may provide as many of these as are necessary.

We now come to the terminal switch, located at the end of the track whereby the cars which have passed along the main track to the end of the room may be returned to the return track. In order to economize space, it is best not to construct this terminal track after the manner of the tracks previously described but to provide a somewhat different form of switch whereby the cars may be lowered from the uppermost rails which form the terminations of the main rails of the track to the lowermost rails or return rails.

I designate the terminal section of the track as G and connect the section C of the track with the section G by means of the gate F or bridge which bridges or spans the gangway Z. This bridge F simply consists of the two rails 5ʰ which are braced and connected to each other in any suitable manner and which are adapted to aline with the rails 5ᵉ of the track section C, these rails 5ᵉ constituting the main rails. The rails 5ʰ at their rear ends are attached to offset arms 206 which are riveted to the sides of the rails 5ʰ and extend rearward against the outside faces of the rails 5ᵉ and are pivoted to the projecting ends of the rails as at 207. The rear ends of the arms or extensions 206 are outwardly diverged and are provided with counterweights 208. Extending downward from the pins 208ª are the links 209 which at their lower ends are connected to a cross bar 210. This cross bar is provided at its middle with the upwardly projecting lugs 211 attached to a lever 212, this lever being pivoted at its lower end upon a downwardly projecting bracket 213.

Mounted upon an upwardly projecting bracket 214 is a lever 215 which at its forward end is connected to a plunger rod 216 of a liquid cushion 217 such as will be hereafter described. The rear end of the lever 215 is connected by a link 218 to the middle portion of the link 212. Thus when the gate is raised by hand as shown in Fig. 28, the lever 212 will be operated to operate the lever 215 and actuate the plunger 216. This gate is so balanced by the weights 208 that a few ounces will open it but the gate is not automatic as at this terminal station it is not usual to have an automatic gate. It will be understood that these hand operated gates might be used in a number of places where it is not necessary or desirable to have the gate automatically operated. It will also be understood that this gate is usually closed in the position shown in Fig. 13 so that the cars will run along the rails 5ʰ onto the rails of the terminal section.

The terminal section G consists of an upper set of rails 5ⁱ supported on the supports 2 and the transverse braces 4. The rails 5ⁱ are located somewhat below the level of the rails 5ᵉ and therefore the rails 5ʰ are downwardly curved. The section G is an unloading section the same as the section D; the only difference is that the section G is supposed to be at the end of the room and to be used in connection with a terminal switch H whereby the cars may be shunted to the return track. The rails 5ⁱ are supported at their rear ends upon a cross piece 220, this cross piece being slightly yielding so as to permit the forward ends of the rails to be raised or lowered slightly.

Mounted upon the upper longitudinal members 3 is a downwardly extending yoke 221 which extends across and below the rails and supports the parallel levers 222 which are pivoted each at its middle upon the yoke 221. These levers extend parallel with the rails 5ⁱ and slightly below the same. At their ends the levers are connected by transverse cross pieces 223 and 224. The cross piece 223 has a short link connection with the ends of the levers 222 and immediately supports the rails 5ⁱ, while the cross piece 224 is disconnected from the rails 5ⁱ. Thus a depression of the forward ends of the rails 5ⁱ will rock the levers 222 and cause the rearward ends thereof to rise. The cross piece 224 upon the rear ends of the levers 222 is connected to a brake actuating bar 225. This brake actuating bar 225 is nearly as long as the section of track G and is supported at one end upon the cross bar 224 and at its other end is supported upon a spring 226 extending upwardly from a cross bar 227, this cross bar having the form of a yoke supported by the longitudinal members 3. This cross bar 227 is below the level of the rails. The forward ends of the rails 5ⁱ are supported upon a cross bar 228, which in turn is supported on outwardly diverged leaf springs 229 attached to the upper face of the cross bar 227 in exactly the same manner as was described in connection with the forward end of track section D (as shown in Fig. 33). The supporting bar 228 is provided with downwardly extending guide pins which pass through openings in the cross bar 227 and are provided on their lower ends with limiting nuts 231. The forward extremity of the brake actuating plate 225 is provided with a downwardly depending bolt 232 also passing through the cross bar 227 and provided with a limiting nut upon its end.

Extending transversely across the track below the rails thereof and the cross bar 228, and forward of the cross bar, is a transverse bar 233 which is attached to an upwardly extending member 234, corresponding to the member 161 previously described which, at its upper end, is angularly bent and bifurcated as at 235 (see Fig. 32ª) in the same manner as is the member 161. This engages over a nut or pin 236 which corresponds to the pin 160 on the bolt 158. When the cross piece 233 which is provided with handles 237 at its extremities is drawn down, it engages beneath the notched ends 238 of bell crank levers 239 which correspond to the bell crank levers 164 previously described. The forwardly extending arms of these bell crank levers are rounded and project slightly above the rails 5ⁱ, as shown in dotted lines in Figs. 31 and 32. They are held in their supported position by springs 240, corresponding to the springs 166 (see Fig. 35). The operation of these parts is as follows. When a car runs off of the bridge F onto the rails 5ⁱ, the weight of the car will cause the forward ends of the rails to be depressed and as a consequence the brake plate 24 on the car will engage with the brake plate 225. The greater the load upon the car, the more the forward ends of the rails will be depressed and as a consequence the greater will be the pressure exerted by the brake plate 225 upon the plate 24 and the greater the force with which the brakes will be put on. Thus the amount of force with which the brakes are applied is regulated in accordance with the load. Inasmuch as the brake plate 225 is supported at its rear end by the levers 222 which are connected to the track, it will be seen that a depression of the forward end of the track will cause the rear ends of the levers 222 to rise, thus slightly lifting the rear end of the brake plate 225 and thus causing it to exert a still stronger pressure upon the plate 24 of the next succeeding car, thus stopping this car before it can bunt into the car ahead. With the arrival of each car upon the section G, the brake plate 225 at its rear end will be lifted higher and thus will exert a quicker action upon the brakes on the succeeding cars. It is, of course, very necessary that some means should be provided for this purpose, as otherwise the cars laden with crockery, food etc. would be liable to bunt into each other and cause considerable damage.

When it is desired to allow a car to run off upon the return switch H, the handle 237 upon the cross bar 233 is depressed, whereupon it will become engaged with the notched ends 238 of the trip levers 239 which will hold the cross piece 233 in its depressed position and hold the brake member 225 depressed until the next succeeding car trips the trip levers as previously described, thus releasing the brake member 225 and permitting its return to its normal position.

The rails of the return switch H are designated $5^k$. These rails are supported at their rear ends upon a cross piece 241, which at its ends is pivotally connected to the links 242. These links extend forward and then are upwardly turned and are pivoted at 243 to the terminal uprights $2^c$. The forward ends of the rails $5^k$ are upwardly turned so as to act as buffers, preventing the further movement of the car.

Depending from the upper longitudinal members 3 are the pivoted supports 244, which at their lower ends are pivoted to counterweighted levers 255, the rear ends of these levers being provided with counterweights 256. The forward ends of the levers are connected by links 257 to a cross bar 258 extending beneath the rails $5^k$. The levers 255 are also pivoted near their ends to the links 242. Thus a downward movement of the links 242 will cause the weighted ends of the levers 255 to rise. At the same time the links 242 will swing forward and draw the supporting members 244 forward. It will thus be seen that the rails $5^k$ will be bodily lowered under a weight and against the force of the counterweights 256, and that when the rails have reached their lowest position, they will be inclined downward and rearward.

The forward ends of the rails $5^i$ are supported upon a cross bar 260, the rails $5^i$ extending beyond the cross bar and being cut away on their under sides as at 261 (see Fig. 32) so as to fit over the cutaway portions 262 of the rails $5^k$ (see Fig. 36) when the rails $5^k$ are in their raised position. The cross bar 260 is provided with an iron 263 having a downwardly depending portion and a lip 264. The track section H forming the return switch is provided with means whereby the track section may be engaged with the depending lip 264 and so held from any downward movement until it is desired to lower the track section. For this purpose the rear ends of the rails $5^k$ are provided with a cross bar 265 carrying a guide 266, through which passes a reciprocating bolt-like member 267, this member being longitudinally slotted as at 268 and 269 (see Fig. 36). A guide 270 projects upward from the face of the cross bar 241 and into the slot 269, while a pin 271 extends downward from the brake plate 272 through the slot 269. The member 267 is provided at its rear end with a downwardly extending terminal 273 which engages with the lip 264. When the member 267 is retracted, however, the terminal 273 disengages from the lip 264 and permits the switch section to be lowered. As a means for shifting the sliding member 267, I have provided the oppositely projecting levers 274 which are pivoted upon brackets 275 and which engage a pin in the sliding member 267. These levers 274 are provided with projecting handles whereby they may be operated from either side of the device. By operating these levers the bolt-like member 267 may be withdrawn, whereupon the switch section will sink under the weight of the car. As the switch section rises after the car has been discharged, the inclined face of the member 273 will strike against the projecting lip 264 and the bolt will be forced inward automatically against the force of a spring 277. Mounted upon the pin 271 is the brake plate 272, this plate being supported by the spring 278. The forward end of the brake plate is mounted so that the rear end may be depressed to permit the cars to pass off from the switch, after the switch has been lowered to its lowest position but not before. Pivotally mounted upon each one of the rails $5^k$ is a stop 280. The depending portion of this stop extends downward in the arc of a circle as at 281 and contacts with any suitable abutment mounted upon the lower set of longitudinal members 3 when the switch is in its fully lowered position, thus releasing the car and permitting it to pass off the switch. The switch is counterweighted sufficiently to raise the switch after the car runs off, and the counterweights may be assisted in their action by means of springs 282 which are attached to lugs 283 disposed on the lowermost longitudinal members 3, the upper ends of the springs engaging with studs projecting from the levers 255.

Connected to the cross bar 258 is the plunger rod 284 which enters a cushioning cylinder 285 which is a single acting cushion and prevents the switch from slamming either when it is lowered or when it is raised. Attached to the lower longitudinal members 3 are the upper ends of downwardly and rearwardly inclined rails 286. The lower ends of these rails extend downward and rearward and join the rails 5¹ which form the return track and which pass beneath the superposed rails back to the kitchen.

It will be seen that all the cars which go as far as the terminal G will be returned by the return switch H upon the return rails 5¹. The switch points 192 are, of course, held up in a horizontal position by the counterweights 196 and as a consequence the returning cars will pass under the switch points 192, unless these switch points are depressed to permit the car to run down from the section E onto the return track. The returning cars pass beneath the supports for the switch and gate section B, and beneath the forward end of the section A the rails 5¹ are upwardly inclined so as to connect with a terminal section L. The rails 5ᵐ of this terminal section extend rearward at a slight downward inclination and aline with the rails 5ⁿ of a section M. This section M is connected by transverse cross bars 287 which carry between them the brake actuating plate 288, this plate being slightly higher at its rear end than at its forward end so that cars running upon the section M will be brought to a standstill.

Attached to the rails of the section M are the forwardly extending arms 289, which arms extend parallel to the rails 5ᵐ but are laterally spaced therefrom and depressed below the rails. At their forward ends these arms 289 are pivotally connected to upwardly extending links 290. The arms 289 are also connected by a cross bar 291 which carries upon it a bridge piece 292 supporting a brake plate 293. The rear end of this brake plate is supported upon the bridge piece 292 slightly above the faces of the rails 5ⁿ, while the forward end of this brake plate 293 extends down flush with the rails 5ᵐ.

Pivotally mounted upon the rear ends of the rails 5 of the track section A are the arms 294 to which are connected the switch points 295. These points are downwardly curved and the lower or terminal ends of the points are so formed as to engage over the upper faces of the rails 5ᵐ when the points are lowered. The rear ends of the arms 294 are supported by means of a cross bar 296, to the ends of which are pivoted the downwardly extending links 290. It will thus be seen that as a car runs upon the section M, this section of the track will be depressed, thus raising the forward ends of the arms 289 and the brake plate 293. This raises upon the links 290, which in turn raise upon the forward ends of the counterweighted arms 294 and depresses the switch points 295. The car is then pushed up the points 295 by hand onto the rails 5. As soon as the car has left the switch points 295, the counterweights raise the points.

It is particularly necessary in a device of this character that means be provided whereby the various gates, bridges, switches etc., shall be prevented from slamming or coming with considerable force against the sides upon which the members rest. In order to prevent this slamming, I have devised a peculiar form of cushion which is illustrated in detail in Fig. 37, this cushion or slight modification thereof being used on all the switches and gates or bridges. Each cushion comprises a cylinder 300 designed to contain oil or other fluid and closed at one end by the screw threaded plug 301, having thereon a knuckle 302 whereby the cylinder may be pivotally connected to any suitable support. The interior of the cylinder is grooved from one end to the other and these grooves it will be seen in Fig. 37 are cut quite deep near the top of the cylinder and become shallower as they near the bottom, thus letting the piston work freely at the top and gradually retarding the motion as the piston moves downward without any sudden jar. The oil works through these grooves outside the piston and as the piston nears the bottom it moves very slowly as the oil has no outlet except through certain small holes in the piston. The piston is designated 303 and is mounted upon a piston rod or plunger 304 which passes up through a head 305 closing the upper end of the cylinder 300.

The piston 303 is formed with a plurality of relatively large openings 306 and is also provided with oppositely disposed relatively small openings 307. The large openings are closed by a disk-like valve 308 which is disposed beneath the piston and plays up and down upon a sleeve 309 which surrounds the lower end of the piston rod and is held in place by a nut 310. When the piston rod moves down, the valve 308 moves up against the lower face of the piston, thus closing the openings 306. The oil or other fluid used therefore can only escape through the openings 307. Upon an upward movement of the piston, however, the valve 308 drops, permitting the oil to pass through the openings 306 and thus while somewhat checking the movement of the piston not materially retarding it.

In order to prevent the oil from splashing up against the head 305 and being forced out through the piston rod opening in the head, I provide a dash-plate 311 which works freely on the rod 304. This dash-plate is perforated with a plurality of small perforations and thus offers no resistance on the up stroke of the piston, while preventing the splashing of the oil upon the down stroke of the piston. It will be understood that the depth of the grooves in the cylinder 300 depends upon the load to be carried. Where the loads are light, the grooves are deeper than where the loads are heavy. For all the switches, the cushions are single acting and operate upon the downward movement of the piston. For the return switch in section E, however, the cushioning device cushions upon an upward movement of the piston and the parts illustrated in Fig. 23 are reversed for this reason; the construction, however, is exactly the same.

The cushion formed by the cylinder 217 and the piston 216 for cushioning the gate F operates precisely the same as the other cushions, in that when the counterweight 208 on the extremities of the arms has reached the middle of its travel, the cushioning piston has been drawn out its fullest extent, and that upon a further downward movement of the counterweight, the piston starts to travel downward and reaches its lowest position when the gate is fully open, as shown in Fig. 28, in exactly the same manner that it does when the gate is fully closed. This same operation is true of all the gates or bridges, the cushioning devices for which are double acting.

While I have referred to the use of oil within the cushioning cylinders, I do not wish to be limited to oil as it is obvious that any fluid might be used and that the cushioning cylinders would work equally well whether oil, air, gas or water were used within the cylinders.

The operation of my mechanism will be plain from what has gone before. The cars are loaded at the starting section A and are then run by hand upon the false rails 52. From there on the action is automatic, the weight of the car and the switch operating members 30 on the car acting to set the switches or to permit the car to run along the main track to the terminal. The cars are released from their several unloading sections by hand but are returned to the loading section by gravity. Provision is made it will be seen whereby the cars are braked when they arrive at their destinations, and whereby a rear car is prevented from bumping into a forward car. Provision is also made for preventing the cars from moving down the switches until the switches have been fully set. By using the gates or bridges, I permit the use of a relatively low track structure, thus placing the car in convenient position for removing the articles carried thereon. If passageways and bridges or gates were not provided, it will be obvious that the track structure would have to be high enough to permit the passage of waiters and other persons below the track structure, thus rendering it very difficult to remove the articles from the cars, and necessitating a quite complicated system of switching devices in order to lower the cars to a convenient position. While my invention is particularly designed for and peculiarly adapted to transporting articles from a kitchen to a serving room, it will of course be understood that it might be applied to a large variety of uses and can be used for ordinary transportation purposes, as for instance in fair grounds and like situations.

While I have shown a length of track which includes a starting section, a combined bridge and switch, an unloading section and a terminal section, it is to be of course understood that the track system may extend to any desired length and be provided with a plurality of these bridges, unloading stations, return switches, etc. The engaging faces of the rail structure and the gates and switches may be covered with rubber, felt or like material so as to prevent any noise when the parts come together, and furthermore, the shock incident to the meeting of these parts is deadened by means of the cushions before described.

In Fig. 1 I have shown a diagrammatic view of the complete track structure, the details of the track structure, however, being omitted. This view simply illustrates the general arrangement of the tracks, gates and switches.

While throughout the description and in the drawings I have shown one switch designed to be operated by the switch actuating member 30 on the car, it will of course be understood that I may have as many switches as desired, and that the number of switch actuating members will depend upon the number of switches. Where a plurality of pairs of switch actuating shoes or plates are used, it will be obvious that a plurality of actuating shafts for each pair of plates or shoes must be used, these shafts being so set as to be independently actuatable so that any or all of the pairs of shoes or plates may be raised, or any one of any pair of shoes or plates depressed. Preferably, of course the devices are so arranged that the cars may be turned end for end, though this is not absolutely necessary, as ordinarily the cars will return to the starting point extending in the same relative direction that they did when they started.

Various minor modifications might be made without departing from the spirit of my invention and I do not wish to be limited to any of the details illustrated.

What I claim is:

1. A transportation system including in its organization an upper track, a lower track disposed immediately beneath the upper track, a switch for directing a car from the upper track to the lower track, and means for bodily lowering the switch from the upper track toward the lower track and for simultaneously rotating the switch to lower its point end into engagement with the lower track.

2. A transportation system including in its organization an upper track, a lower track disposed immediately beneath the upper track, a switch for directing a car from the upper track to the lower track, said switch being bodily depressible and rotatable in a vertical plane, counterweights normally urging the switch in a position in alinement with the upper track, latching means for preventing the bodily lowering of the switch, and counterweights for resisting the rotative movement of the switch.

3. A transportation system including in its organization an upper track, a lower track disposed immediately beneath the upper track, a switch for directing the car from the upper track to the lower track, means holding said switch in a raised position, means actuated by the arrival of a car upon the switch for releasing said holding means to thereby permit the weight of the car to lower the switch to engage the track immediately beneath, means for returning the switch to its original position, and means for holding a car upon the switch until the switch has reached its lowered position.

4. A gravity transportation system including in its organization a main track, an unloading track disposed beneath the main track, a return track disposed beneath the unloading track and conterminous with the main track, an automatic switch in the main track whereby a car may be directed onto the unloading track or directed along the main track, an automatic switch located at the end of the unloading track whereby the car may be directed onto the return track, and an automatic switch at the end of the main track whereby a car may be directed from the end of the main track onto the return track, and means on the return track whereby a car may be shifted from the return track to the starting point of the main track.

5. A gravity transportation system including in its organization an elevated main track, an unloading track disposed below the main track, both of said tracks being inclined in one direction, a return track disposed below the unloading track and inclined in the opposite direction, a counterbalanced switch located in the main track and adapted to direct a car from the main track to the unloading track, a locking device holding the switch normally in alinement with the main track, a counterbalanced switch located at the end of the unloading track and operated by the weight of a car to shift the car from the unloading track to the return track, a counterbalanced switch located at the end of the main track and operated by the weight of a car to shift the car from the end of the main track to the return track, a car, and means on the car for unlocking said first named switch to permit the car to move from the main track to the unloading track.

6. A transportation system including in its organization a horizontally disposed elevated interrupted track, and a track disposed below the first named track, a track section adapted to bridge the interruption of the first named track and movable from a vertical position to a horizontal position to connect the first named track sections and to a downwardly inclined position to connect one of the first named tracks to the second named track, said track section forming a gate which in its raised position permits passage through the interruption of the track, and means whereby the gate track section may be shifted to bring its rails into or out of operative engagement with the first named track rails upon the arrival of a car thereon, and means whereby said gate track section may be shifted to bring its rails into or out of operative engagement with the lower track upon the gate track section.

7. A transportation system including in its organization an elevated track including two fixed track sections horizontally spaced from each other, a track disposed beneath the first named track, a vertically movable track section pivoted at one end to one of the first named fixed track sections and adapted to bridge the interruption of the track or to connect one of the first named fixed track sections with the lower second named track, means for normally holding the movable track section in a vertical position, means whereby the movable track section may be shifted into a horizontal position to bridge the gap between the first two named track sections upon the approach of a car, means for directing the movable track section in a horizontal position, and means operated by a car on said track section for unlocking the movable track section and permit it to drop into engagement with the lower track.

8. A transportation system including in its organization an elevated horizontally disposed interrupted track including parallel rails, a track section for bridging the interruption of the track and including track rails, said track section being pivotally mounted at one end and being counterweighted to normally hold it in a vertical position, and means operated by an approaching car to shift the track section from a vertical to a horizontal position to bring its rails into or out of operative engagement with the track rails.

9. A transportation system including in its organization an elevated structure, separated main track sections supported upon the elevated structure, a track section supported below and conterminous with one of the main track sections, a track section for bridging the interruption between the two main track sections and including track rails, and means whereby the switch track section may be shifted to bring its rails out of engagement with the main track section and into engagement with the second named track section upon the approach of a car.

10. A transportation system including in its organization an elevated main track, said track being interrupted, the terminal rails at one side of said interrupted portions of the track being mounted for vertical movement under the weight of a car, rails disposed below the said vertically movable rails and with which rails the first named rails aline when they are depressed, and a pivoted track section adapted to bridge the interruption in said main track, counterweights holding the said track section in a vertical position, and levers operatively engaging said bridging track, and the pivoted rails of the first named track whereby upon a depression of the first named track the levers shall be operated to depress the bridging track section to a horizontal position.

11. A transportation system including in its organization an elevated track section for supporting cars while being loaded, a main track section forming a continuation of the first named track section and supported in the same plane thereas, an unloading track section disposed below the main track section, and a switch movable from a position of alinement with the main track section into alinement with the unloading track section, means operated by the car for lowering the switch, and means for returning the switch to a normal position.

12. A transportation system including in its organization an elevated track section for supporting cars while being loaded, a main track section forming a continuation of the track section, an unloading track section disposed below the main track section, a return track section disposed below the unloading track section, a switch movable from a position of alinement with the main track section into alinement with the unloading track section, said switch being counterweighted, means operated by the car for lowering the switch to direct the car from the main track to the unloading track, a switch on the unloading track adapted to direct the car from the unloading track to the return track, and means whereby the switch may be operated by the arrival of the car thereon.

13. A transportation system including in its organization an elevated track section for supporting cars while being loaded, a main track section forming a continuation of the loading track section but separated therefrom, an unloading track section disposed below the main track section and forming a combined bridge and switch section disposed in the interruption between the main track and the loading section, and pivotally connected to the loading section, said switch section being movable into operative engagement with the unloading section, means normally holding the switch section in a vertical position, means operated by the weight of an approaching car for turning said section to a horizontal position and into operative engagement with the main track, and means operated by the car for further depressing said section into operative engagement with the unloading track section.

14. A transportation system including in its organization two elevated main track sections separated from each other, a switch section pivotally mounted in connection with one of said main track sections and movable into engagement with the other of said main track sections, means for normally holding said switch in a vertical position, means for locking the switch in a horizontal position in operative engagement with both of the main track sections, a track section disposed below one of the main track sections and forming an unloading section, a car, means operated by the weight of said car for turning the switch into a horizontal position to connect the sections of the main track, and means on the car for unlocking the switch and permitting it to be depressed by the weight of the car to a position to bring its free end in engagement with the unloading track section.

15. A transportation system including in its organization two elevated main track sections separated from each other, a switch section pivotally mounted in connection with one of said main track sections and movable into engagement with the other of said sections, means for normally holding the switch in a vertical position, means for locking the switch in a horizontal position in operative engagement with both of the main track sections, a track section disposed below one of the main track sections and forming an unloading section, a car, means operated by the weight of said car for turning the switch from a vertical to a horizontal position to connect the sections of the main track, means on the car for unlocking the switch and permitting it to be depressed by the weight of the car to a position to bring its free end in engagement with the unloading track section, and means on the switch section for preventing the car from passing down the switch section when depressed below a horizontal position, said means being tripped to permit the passage of the car when the switch is connected with the unloading section.

16. A transportation system including in its organization an elevated main track section, a track section disposed below said main track and opposite thereto, a switch pivotally mounted in connection with said main track section and movable into engagement with the lower track section, means operated by the weight of a car for rotating said switch from a position connecting said main track section to a position connecting said main track section to the lower track section, car operated means rotating the switch from a horizontal position to a downwardly inclined position to bring its free end into engagement with the lower track section, and means on the switch section for preventing the car from passing down thereon when depressed below a horizontal position, said means being tripped to permit the passage of the car when the switch is engaged with the lower track section.

17. A transportation system including in its organization two elevated main track sections separated from each other, a switch section pivotally mounted in connection with one of said main track sections and extending into operative engagement with the other of said main track sections, means for locking the switch in operative engagement with both of the main track sections, an unloading track section disposed below one of the main track sections, a car, means on the car for unlocking the switch and permitting it to be depressed by the weight of the car to a position to bring its free end in engagement with the unloading track section, counterweights for returning the switch to its original position, and means for holding a car upon the switch section while it is being depressed below a horizontal position.

18. A transportation system including in its organization two elevated main track sections separated from each other, a switch section pivotally mounted in connection with one of said main track sections and extending into engagement with the other of said main track sections, means for locking the switch in a horizontal position in operative engagement with both of the main track sections, a track section disposed below one of the main track sections and forming an unloading section, tripping mechanism disposed on the switch section and adapted when actuated to unlock the switch to permit it to be depressed, a braking device mounted upon the switch section and vertically movable upon an actuation of the tripping device, a car, means on the car for actuating the tripping device to permit the depression of the switch, and means on the car engageable by the brake device to hold the car upon the switch when it is being depressed.

19. A transportation system including in its organization two elevated main track sections separated from each other, a switch section pivotally mounted at one end in connection with one of said main track sections and movable at its other end into engagement with the other of said main track sections, said switch section being formed in two parts pivoted to each other, one of said parts forming a gate, means for holding said gate in a vertical position, means for locking the gate in a horizontal position in operative engagement with the main track section, a track section disposed below one of the main track sections and forming an unloading section, means operated by the weight of a car for turning the gate into a horizontal position in alinement with the main track, and means actuated by a car and disposed upon the gate section for unlocking the switch and permitting the switch to be depressed by the weight of the car to a position to bring its free end into engagement with the unloading track section.

20. A transportation system including in its organization two elevated main track sections separated from each other, a gate section pivotally connected to the rails of one of the main track sections and movable into engagement with the rails of the other of said main track sections, means for normally holding said gate section in a vertical position, means operated by the weight of a car for depressing said gate section to a horizontal position, and means for cushioning the gate as it reaches the limit of its travel from a vertical to a horizontal position or vice versa.

21. A transportation system including in its organization a supporting framework, parallel rails pivotally mounted at their rear ends to said supporting framework, a rock shaft mounted in the forward ends of said rails, a switch section including parallel rails pivoted to said rock shaft, counterweighted arms extending rearward from the pivoted rails and normally holding the same in a vertical position, arms on the rock shaft, and oppositely disposed angular levers mounted on the frame, the forward ends of said levers engaging said arms, and means actuated by the weight of a car for rocking said levers to depress the pivoted rails into a position of alinement with the first named rails.

22. A transportation system of the character described, including in its organization a supporting frame, a track section comprising parallel rails pivoted at their rear ends to said supporting frame, a switch including parallel rails pivotally connected to the forward ends of the first named parallel rails, means for holding said switch normally in a vertical position, means for holding the track section and switch in a horizontal alined position, means for unlocking the forward end of the track section to permit said forward end and the switch section to be depressed, means for holding the switch section in an approximately horizontal position while it is moving downward with the forward end of the pivoted track section, and means for raising said track section and switch.

23. A transportation system of the character described, including in its organization a supporting frame, a track section comprising parallel rails pivotally connected at their rear ends to the supporting frame, a switch section including parallel rails pivotally connected to the forward ends of the first named rails, counterweights for normally holding the switch section in a vertical position, means for depressing said switch section upon the arrival of a car on the track section to bring the switch section to a horizontal position, car actuated tripping mechanism for unlocking the track section and the switch section and permitting the forward end of the track section to lower and carry with it the switch section, means for supporting the switch section in a horizontal position while it is being lowered, and means for returning the parts to their original position.

24. A transportation system including in its organization a main track section, an unloading track section disposed below the main track section, switch points pivotally mounted above the return track section and normally supported in a horizontal position, and a switch pivoted to the end of the unloading section and movable into a position of alinement with the unloading track section or into a downwardly inclined position, and operative connections between the switch and the switch points whereby when the switch is depressed to its inclined position the switch points shall be turned into alinement with the switch and into operative engagement with the return track section.

25. A transportation system including in its organization an elevated main track section, an elevated unloading section disposed below the main track section, means for shunting a car from the main track section to the unloading track section, a return track section below the unloading track section and parallel therewith, a return switch pivotally mounted, counterweights for holding the return track section in alinement with the unloading section, switch points counterweighted to support them in a horizontal position, means for holding the free end of the switch in engagement with the unloading track section, car actuated means for disengaging the free end of the switch from the unloading section, permitting it to be depressed by the weight of a car, and connections between the switch points and the switch whereby the switch points shall be turned into an inclined position in alinement with the switch upon a depression of the switch.

26. In a transportation system, a car having a depending braking means and a track section having a movable braking member coacting with the braking means on the car, and means operated by the weight of the car for relatively moving the braking members into frictional engagement with each other.

27. A transportation system including in its organization an elevated track section, a track section disposed below the first named track section, means for shunting a car from the first named to the second named track section, a brake plate disposed between the rails of the second named track section in position to engage the car, and means actuated by the weight of the car for forcing said brake plate upward.

28. A transportation system including in its organization an elevated track section, a track section disposed below the first named track section, means for shunting a car from the first named to the second named track section, a brake plate disposed between the rails of the second named track section in position to engage the car, and means actuated by the weight of the car for forcing the forward end of the brake plate upward.

29. In a transportation system of the character described, a track section including parallel rails, said rails being pivotally supported at one end and yieldingly supported at the other, a lever extending between the rails and pivoted intermediate its ends, a link connection between the forward end of the lever and said rails, a brake plate disposed between the rails and vertically movable, and a connection between the rear end of the lever and the brake plate whereby the weight of a car upon the forward ends of the rails shall raise the rear end of the brake plate.

30. A transportation system including in its organization a track section having parallel rails, said rails being downwardly inclined toward one end, a return switch pivotally mounted adjacent to the lowest end of the track section, the free end of said switch engaging the track section, a latch for holding the free end of the switch in engagement with the track section, an unlatching means disposed between the rails of the switch and connected to said latch, and counterweights for normally holding the switch in a horizontal position in alinement with said track section.

31. A transportation system including in its organization a track section having parallel rails, said rails being downwardly inclined toward one end, a return switch pivotally mounted adjacent to the lowest end of the track section, the free end of said switch engaging the track section, a latch for holding the free end of the switch in engagement with the track section, and an upwardly inclined brake plate mounted upon the switch section for checking the movement of the car running upon said section.

32. A transportation system including in its organization a section of track having rails pivoted at their rear ends, the forward ends of the rails being yieldingly supported, a return switch extending from the yieldingly supported rails of the track section, means for depressing the free end of the track section to permit a car to run upon a switch, and means for releasing the free ends of the track section to permit it to return to its original position.

33. A transportation system including in its organization a track section having spaced parallel rails, the rails at one end being pivoted, resilient yielding means for supporting the other ends of the rails, a return switch with which said rails connect, a yieldingly supported brake member disposed between the rails, means for depressing the free ends of the brake member against said yielding means and locking it in this depressed position, and means for automatically releasing said brake member to permit it to return to its normal position upon the passage of a car onto the switch.

34. A transportation system including in its organization a track section comprising parallel rails pivotally mounted at one end, springs for supporting the free ends of the rails, a brake plate yieldingly supported between the rails, a manually operated member for depressing said brake plate, and latches for holding the brake plate depressed, said latches extending above and adjacent to the rails and being operated to release said member upon the passage of a car to allow the parts to return to their normal position.

35. A transportation system including in its organization a track section having parallel rails, the track section being pivoted at one end and yieldingly supported at the other end, a return switch coacting with the track section and normally alining with the yielding ends of the rails, a brake plate supported between the rails and independently movable with relation thereto, resilient means for supporting said brake plate in a raised position, manually operated means for depressing said brake plate, and spring actuated latches holding the brake plate depressed, said latches extending parallel to the rails of the track section in position to be actuated by a car to release said brake plate.

36. In a transportation system of the character described, a track section having parallel rails, a longitudinally extending brake plate disposed between the rails, and yielding means for supporting said brake plate, of a car having a longitudinally extending, vertically movable brake plate disposed between its wheels in position to contact with the brake plate on the track, brake shoes engaging the wheels of the car, and operative connections between the brake plate and said brake shoes whereby the brake shoes shall be forced against the wheels of the car upon an upward movement of the brake plate on the car.

37. In a transportation system of the character described, the combination of a car having wheels, a rock shaft on the car, an arm on the rock shaft having a brake shoe contacting with the wheels, a brake plate disposed between the wheels and operative connections between the brake plate and the brake shoe whereby the brake shoe shall be operated upon an upward movement of the brake plate, of a track section including parallel rails, and a resiliently supported brake plate located between the rails in position to contact with the brake plate on the car.

38. In a transportation system of the character described, the combination of a car having wheels, a rock shaft on the car, an arm on the rock shaft having a brake shoe contacting with the wheels, a brake plate disposed between the wheels and operative connections between the brake plate and the brake shoe whereby the brake shoe shall be operated upon an upward movement of the brake plate, of a track section including parallel rails, a resiliently supported brake plate located between the rails in position to contact with the brake plate on the car, and means for depressing said brake plate.

39. In a transportation system of the character described, the combination of a car having wheels, a rock shaft on the car, an arm on the rock shaft having a brake shoe contacting with the wheels, a brake plate disposed between the wheels and operative connection between the brake plate and the brake shoe whereby the brake shoe shall be operated upon an upward movement of the brake plate, of a track section including parallel rails, a resiliently supported brake plate located between the rails in position to contact with the brake plate on the car, and means for manually depressing the brake plate.

40. In a transportation system of the character described, the combination of a car having wheels, a rock shaft on the car, an arm on the rock shaft having a brake shoe contacting with the wheels, a brake plate disposed between the wheels and operative connections between the brake plate and the brake shoe whereby the brake shoe shall be operated upon an upward movement of the brake plate, of a track section including parallel rails, a resiliently supported brake plate located between the rails in position to contact with the brake plate on the car, means for manually depressing the brake plate, latches for holding said manually operated means and the brake plate in their depressed positions, and means for tripping said holding means, arranged in position to be operated by the wheels of the car.

41. A transportation system of the character described, including in its organization a supporting frame, a pair of rails pivoted at one end in the supporting frame, a cross bar connecting the free ends of the rails, a cross bar mounted on the frame, springs on said cross bar engaging the first named cross bar, a brake plate extending between the rails, means for yieldingly supporting the brake plate upon the second named cross bar, a transversely extending operating member operatively engaged with the brake plate, oppositely disposed latches engaging the operating member when depressed to hold it in its depressed position, said latches having arms extending parallel with the rails and engageable by the wheels of a car to release the latches, and vertically disposed guides for the brake plate and rails.

42. A transportation system of the character described, including in its organization interrupted track sections, a gate pivoted to one of said track sections and including parallel rails adapted to aline with the rails of said track sections, rearwardly extending arms on the gates, counterweights thereon, a cushioning mechanism including a cylinder and piston, and means connected to said arms for depressing the piston within the cylinder at the extremity of movement of the gate in either direction.

43. A transportation system including in its organization an elevated interrupted track section, a gate including parallel rails pivoted to one of said track sections and adapted to be moved into alinement with the other track section, said gate being vertically movable to permit passage between the track sections, arms extending rearward from the gate, a cushioning cylinder, a piston therein, a lever pivotally supported intermediate its ends and connected at one end to the piston, a lever parallel to the first named lever and pivoted at one end, a link connecting the first named and second named levers, and a link connecting the end of the second named lever with the rearwardly extending arms of the gate.

44. A transportation system including in its organization an elevated main track section, a terminal switch located at the end of the main track section and including spaced rails, a return track including spaced rails, means operated by the arrival of a car upon the switch for depressing said switch to shunt the car from the main track section to the return track section, and a member mounted on the switch engaging the car to hold it upon the switch until the switch is fully depressed.

45. A transportation system including in its organization a main track section, a terminal switch disposed at the end of the main track section, a return track having the end thereof extending upward toward the switch, a latch for holding the switch in its raised position in alinement with the rails of the main track section, means for returning the switch to its normal position, and hand operated means for releasing the latch and permitting the switch to be depressed by the weight of a car thereon.

46. A transportation system including in its organization an elevated main track section, a return track section disposed beneath the main track section and having upwardly extending rails, a bodily depressible switch supported in conjunction with the main track section, counterweights for supporting the switch in a normally raised position, a latch for engaging the switch with the main track section, and hand actuated means for releasing said latch and permitting the switch to be depressed by the weight of a car.

47. In a transportation system, an elevated track section having parallel rails, the track section being pivotally supported at one end and yieldingly supported at the other, a brake plate disposed between the rails of the track section, means for raising the brake plate as the yieldingly supported ends of the rails are depressed by the weight of a car, means for depressing the brake plate to permit the car to run off the rails, a terminal switch, a latch for holding the terminal switch in engagement with the main track section, hand operated means for releasing the latch to permit the switch to be depressed under the weight of a car, a return track with which the switch alines when it is depressed, counterweights for raising the switch when relieved from the weight of a car, and means on the switch for holding a car upon the switch until it is fully depressed.

48. In a transportation system of the character described, a switch including parallel pivoted rails, a brake plate disposed between the rails and adapted to engage a car to hold it upon the switch, and means for releasing the engagement between the brake plate and car when the switch is fully depressed.

49. In a transportation system, a main track section, a switch normally supported in alinement with the main track section and including parallel rails, a longitudinally disposed brake plate mounted between said rails, said brake plate being vertically movable, yielding means for supporting the brake plate, and means for depressing said brake plate when the switch has been depressed to its full position.

50. In a transportation system, the combination with a car having a yieldingly supported vertically movable brake plate mounted beneath the same, of a track section having a pivotally supported brake plate, so located as to engage with the brake plate on the car, resilient means for holding one end of the brake plate in a raised position, means for locking the free end of the brake plate in a depressed position, and means actuated by a car for releasing said locking means to permit the upward movement of the free end of the brake plate.

51. In a transportation system, the combination with a car having a vertically movable, resiliently supported brake plate mounted beneath the car, of a track section including parallel rails, a longitudinally extending brake plate extending between said rails, means actuated by the weight of the car for raising said brake plate into position to engage with the brake plate on the car, and hand operated means for depressing said brake plate out of engagement.

52. In a transportation system of the character described, an elevated track section, a switch coacting with the track section and including parallel rails, said rails being depressible into an inclined position with relation to the track structure, a resiliently supported brake plate mounted between the rails of the switch and normally projected upward, means for lowering said brake plate when the switch has reached a fully depressed position, and a car traveling upon said rails, a brake plate resiliently supported beneath the car, said plate being vertically movable and disposed in position to engage the brake plate on the switch section.

53. A transportation system including an elevated track section, a return track section located below the first named track section, a switch section normally supported in alinement with the main track section but depressible into engagement at one end with the return track section, a latch for holding the switch in its horizontal position, a car, a longitudinally extending switch actuating member disposed beneath the car in position to engage the latch on the switch, a transversely extending rock shaft on the car, and connections between said rock shaft and the switch actuating member for raising or lowering the switch actuating member upon a rotation of the rock shaft.

54. In a transportation system of the character described, a switch, a locking device for the switch, a latch for releasing the locking device and located between the rails of the switch, a car traveling on the switch, a longitudinally extending plate adapted to engage said latch and mounted beneath the car, vertically movable supports for the plate, a rock shaft, a pointer on the rock shaft to indicate its position, and connections between the rock shaft and the supports for the plate whereby the brake plate may be raised or lowered upon a rotation of the rock shaft.

55. In a transportation system of the character described, a car for traveling over the rails of the system, a longitudinally extending switch actuating plate disposed beneath the car, upwardly extending posts on the plate, sockets in which said posts are received, a transverse rock shaft, a disk on the rock shaft, bell crank levers pivotally supported on the car body and connected to said posts, oppositely disposed wrist pins on the disk, and links connecting each of said wrist pins with the opposite bell crank lever.

56. In a transportation system of the character described, a car for traveling over the rails of the system, a pair of longitudinally extending switch actuating plates disposed beneath the car, a transverse rock shaft having an index pointer, a dial over which the pointer moves, and connections between the rock shaft and the switch actuating plates whereby when the rock shaft is turned in one direction, one of said plates shall be raised and the other lowered.

57. In a transportation system of the character described, a car for traveling over the rails of the system, a longitudinally extending switch actuating plate disposed beneath the car, a rock shaft mounted on the car and having a pointer at one end, a dial over which the pointer moves, and operative connections between the rock shaft and switch actuating plate whereby when the rock shaft is rotated in one direction the plate shall be raised and when rotated in a reverse direction the plate shall be lowered.

58. A transportation system of the character described including in its organization an elevated main track, an unloading track located below the main track, a return track coextensive with the main track and disposed below the unloading track, switches on the main track for directing a car either onto the unloading track or the return track, a switch operatively connected to the unloading track for returning a car upon the return track, a normally elevated switch at the end of the return track connecting with the starting portion of the main track, and means whereby said switch may be lowered to permit a car to be returned from the return track to the main track.

59. A transportation system of the character described, including in its organization an elevated main track having a general inclination from its starting point to its termination, an unloading track disposed beneath the main track, a return track coextensive with the main track and disposed below the unloading track, an intermediate switch for directing the car from the main track to the unloading track, a terminal switch for directing the car from the end of the main track to the return track, a switch for directing the car from the unloading track to the return track, said switch being normally raised but depressible under the weight of a car into operative engagement with the return track, and means at the end of the return track for permitting a car to be moved upward to the starting point of the main track.

60. A transportation system of the character described, including in its organization an elevated main track interrupted at a plurality of points by transverse passages, an unloading track disposed below the main track, a return track disposed below the unloading track and coextensive with the main track, gates disposed each at an interruption of the main track and adapted to bridge said interruption, one of said gates being adapted to be moved downward below the main track to connect with the unloading track, a switch at the end of the main track for returning the cars onto the return track, said switch being normally in an inoperative position, a switch at the end of the unloading track for returning the cars to the return track, said switch being normally in an inoperative position and raised above the return track to permit the passage of cars beneath, and a switch at the end of the return track, normally in a raised position but depressible to guide a return car onto the initial portion of the main track.

61. In a transportation system of the character described, a car provided with a plurality of longitudinally extending switch actuating members disposed beneath the car, and means on the car for simultaneously depressing certain of said switch actuating members into operative position and raising certain other of the switch actuating members out of operative position, said means being movable to an intermediate position to raise all of said switch actuating members out of operative position.

62. In a transportation system, a car provided with two longitudinally extending parallel switch actuating members disposed beneath the car, an operating member operatively connected to the switch actuating members and movable in one direction to depress one of said members and simultaneously raise the other, or into another position to raise the first named member and depress the last named member, or movable into a third position to raise both of said members from an operative position, and a coacting dial and pointer operated by the actuating member and showing the set position of said switching actuating members.

63. A transportation system of the character described, including in its organization a main track, an unloading track and a return track disposed in vertical series, an automatically operated switch for directing a car onto the unloading track or permitting the car to pass along the main track, a pivoted switch at the end of the main track for directing the car onto the return track, means for normally holding said switch in a horizontal position, means for releasing the switch to permit it to be depressed under the weight of a car, a switch at the end of the unloading track adapted to connect with the return track, means for normally holding said switch in a horizontal position in alinement with the unloading track, means for releasing said switch to be depressed under the weight of a car, and means at the end of the return track for permitting the cars to be raised to the starting portion of the main track.

64. In a transportation system of the character described, a track section, a return track section disposed below the first named track section, a counterweighted switch at the end of the first named track section and adapted to connect with the return track section, means for normally supporting said switch in alinement with the first named track section, means for releasing said switch to permit it to be depressed by the weight of a car, means for holding the car upon the switch until the switch is fully depressed, and means for releasing said holding means when the switch reaches its fully depressed position.

In testimony whereof, I affix my signature in presence of two witnesses.

AARON HORTON. [L. S.]

Witnesses:
C. H. MACOMBER,
J. E. CURTICE.

Copies of this patent may be obtained for five cents each, by addressing the "Commissioner of Patents, Washington, D. C."